(12) United States Patent  
Anezaki et al.

(10) Patent No.: US 8,488,153 B2
(45) Date of Patent: Jul. 16, 2013

(54) IMAGE PROCESSING APPARATUS FOR RESUMING JOB EXECUTION AFTER INTERRUPTION OF WIRELESS COMMUNICATION, JOB EXECUTION METHOD THEREOF AND RECORDING MEDIUM

(75) Inventors: Kazuya Anezaki, Amagasaki (JP); Minako Kobayashi, Ikeda (JP); Takehisa Yamaguchi, Ikoma (JP); Katsuhiko Akita, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 888 days.

(21) Appl. No.: 12/488,108

(22) Filed: Jun. 19, 2009

(65) Prior Publication Data  
US 2009/0316206 A1 Dec. 24, 2009

(30) Foreign Application Priority Data  
Jun. 20, 2008 (JP) ................................ 2008-162396

(51) Int. Cl.  
*G06F 3/12* (2006.01)

(52) U.S. Cl.  
USPC ...................................................... 358/1.15

(58) Field of Classification Search  
None  
See application file for complete search history.

(56) References Cited

U.S. PATENT DOCUMENTS

| 2002/0041394 A1* | 4/2002 | Aoki | 358/1.15 |
| 2002/0085228 A1* | 7/2002 | Yagita | 358/1.15 |
| 2002/0118387 A1* | 8/2002 | Patton | 358/1.15 |

FOREIGN PATENT DOCUMENTS

| JP | 2004-320716 A | 11/2004 |
| JP | 2005-165601 A | 6/2005 |
| JP | 2005-234910 A | 9/2005 |
| JP | 2007-157084 A | 6/2007 |

OTHER PUBLICATIONS

Notification of Reasons of Refusal issued in corresponding Japanese Patent Application No. 2008-162396 mailed Jun. 29, 2010 and an English language translation thereof.

* cited by examiner

*Primary Examiner* — Jeremiah Bryar  
(74) *Attorney, Agent, or Firm* — Buchanan Ingersoll & Rooney PC

(57) ABSTRACT

If a job executed on the data to be processed is stopped due to interruption of a wireless communication with an image processing apparatus and a portable terminal, which happens to occur while the image processing apparatus is receiving the data to be processed, which is transmitted by the portable terminal, the image processing apparatus examines if the portable terminals connected before and after stop of the job execution are one and the same, and requests the portable terminal to retransmit the data to be processed. And then the image processing apparatus resumes executing the job on the data to be processed, which is retransmitted in response to the request.

27 Claims, 25 Drawing Sheets

IMAGE PROCESSING APPARATUS FOR RESUMING JOB EXECUTION AFTER INTERRUPTION OF WIRELESS COMMUNICATION, JOB EXECUTION METHOD THEREOF AND RECORDING MEDIUM

This application claims priority under 35 U.S.C. §119 to Japanese Patent Application No. 2008-162396 filed on Jun. 20, 2008, the entire disclosure of which is incorporated herein by reference in its entirety.

BACKGROUND OF THE INVENTION

1. Field of the Invention

The present invention relates to an image processing apparatus capable of executing a print job for example, on the data to be processed, which is wirelessly received from a user's using portable terminal, a job execution method of the image processing apparatus, and a computer readable recording medium having a job execution program recorded therein to make the image processing apparatus execute processing.

2. Description of the Related Art

The following description sets forth the inventor's knowledge of related art and problems therein and should not be construed as an admission of knowledge in the prior art.

As disclosed in Japanese Unexamined Laid-open Patent Publication No. 2007-157084, there has been known an image processing apparatus such as a MFP (Multi Function Peripheral) that is a multifunctional digital machine, capable of receiving the data to be processed such as the data to be printed out, which is transmitted from a portable terminal such as a cell-phone by using a close-range wireless communication system such as Bluetooth, and then performing data processing on the data to be processed.

As a method to make an image processing apparatus perform data processing, it is known that the data to be processed is directly transmitted to the image processing apparatus from a portable terminal as described above, and it is also known that an XHTML (Extensible Hypertext Markup Language) file or etc. including storage information is transmitted to the image processing apparatus from the portable terminal. More concretely, if the XHTML file includes storage information of the data to be processed, an image file for example, the image processing apparatus can obtain the data to be processed, from a storage location indicated by the storage information, and print out the data to be processed, according to the layout information also included in the XHTML file.

Occasionally, interruption of a wireless communication between the image processing apparatus and the portable terminal happens to occur due to a communication trouble, while the data to be processed is being transferred to the image processing apparatus from the portable terminal as described above.

And also, occasionally, interruption of a wireless communication between the image processing apparatus and the portable terminal happens to occur before the image processing apparatus completely obtains the data to be processed, which is stored in the portable terminal, when the storage information included in the XHTML file and etc. indicates that storage locations each storing the data to be processed, exist inside and outside of the portable terminal.

In such cases above, in a conventional manner, a user using the portable terminal has to start all over again the operation of transmitting the data to be processed and storage information of the data to be processed, to the image processing apparatus, which has limited usability.

Meanwhile, as disclosed in Japanese Unexamined Laid-open Patent Publication No. 2005-165601, there has been a technology to change by using random numbers, an authentication code required to establish a connection between a printing apparatus having the Bluetooth communication function and a portable terminal, at each time of use of the printing apparatus, in order to prevent unauthorized use.

However, none of the technologies described in the publications above provides a complete solution against the problems caused due to interruption of a wireless communication between the image processing apparatus and the portable terminal.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing apparatus that improves usability, by resuming a job execution that is stopped due to interruption of a wireless communication between the image processing apparatus and a portable terminal, without requiring a user using the portable terminal to start all over again the operation of transmitting the data to be processed and storage information of the data to be processed, to the image processing apparatus from the portable terminal.

It is another object of the present invention to provide a job execution method that improves usability, by resuming a job execution that is stopped due to interruption of a wireless communication between the image processing apparatus and a portable terminal, without requiring a user using the portable terminal to start all over again the operation of transmitting the data to be processed and storage information of the data to be processed, to the image processing apparatus from the portable terminal.

It is yet another object of the present invention to provide a computer readable recording medium that has a job execution program recorded therein to make a computer of the image processing apparatus implement the job execution method.

According to a first aspect of the present invention, an image processing apparatus includes:

a receiver that receives the data to be processed, which is transmitted by a portable terminal, wirelessly;

a job executor that executes a job on the data to be processed, which is received by the receiver;

a detector that detects that a job executed on the data to be processed is stopped due to interruption of the wireless communication with the portable terminal, which happens to occur while the receiver is receiving the data to be processed;

a judger that judges whether or not portable terminals connected before and after the detector detects stop of the job execution are one and the same;

a requestor that requests the reconnected portable terminal to retransmit the data to be processed, if the judger judges that the portable terminals are one and the same; and a stopped job execution resuming portion that makes the job executor resume executing the job on the data to be processed, which is retransmitted in response to the requestor's request.

According to a second aspect of the present invention, an image processing apparatus includes:

a receiver that receives data that is transmitted by a portable terminal, wirelessly;

a data obtainer that obtains the data to be processed, from a storage location storing the data to be processed, based on the data including layout information and storage information of the data to be processed, which is received by the receiver;

a detector that detects that a job executed on the data to be processed is stopped due to interruption of the wireless communication with the portable terminal;

a judger that judges whether or not portable terminals connected before and after the detector detects stop of the job execution are one and the same;

a controller that makes the data obtainer continue obtaining the data to be processed, which is stored in the storage location existing outside of the portable terminal, if the data obtainer has not yet completely obtained it by the time the detector detects stop of the job execution, or alternatively, makes the data obtainer continue obtaining the data to be processed, which is stored in the storage location existing inside of the portable terminal, if the data obtainer has not yet completely obtained it by the time the judger judges that portable terminals connected before and after stop of the job execution are one and the same;

a layout portion that layouts all the received data to be processed, according to the layout information; and a job executor that executes a job on the layouted data to be processed.

According to a third aspect of the present invention, a job execution method of an image processing apparatus includes:

receiving the data to be processed, which is transmitted by a portable terminal, wirelessly;

executing a job on the received data to be processed;

detecting that the job executed on the data to be processed is stopped due to interruption of the wireless communication with the portable terminal, which happens to occur while the data to be processed is being received;

judging whether or not portable terminals connected before and after stop of the job execution is detected, are one and the same;

requesting the reconnected portable terminal to retransmit the data to be processed, if it is judged that the portable terminals are one and the same; and resuming executing the job on the data to be processed, which is retransmitted in response to the request.

According to a fourth aspect of the present invention, a job execution method of an image processing apparatus includes:

receiving data that is transmitted by a portable terminal, wirelessly;

obtaining the data to be processed, from a storage location storing the data to be processed, based on the received data including layout information and storage information of the data to be processed;

detecting that a job executed on the data to be processed is stopped due to interruption of the wireless communication with the portable terminal;

judging whether or not portable terminals connected before and after stop of the job execution is detected, are one and the same;

continuing obtaining the data to be processed, which is stored in the storage location existing outside of the portable terminal, if the data to be processed has not yet completely been obtained by the time stop of the job execution is detected, or alternatively, continuing obtaining the data to be processed, which is stored in the storage location existing inside of the portable terminal, if the data to be processed has not yet completely been obtained by the time it is judged that portable terminals connected before and after stop of the job execution are one and the same;

layouting all the obtained data to be processed, according to the layout information; and executing a job on the layouted data to be processed.

According to a fifth aspect of the present invention, a computer readable recording medium has a job execution program recorded therein to make a computer of an image processing apparatus execute:

receiving the data to be processed, which is transmitted by a portable terminal, wirelessly;

executing a job on the received data to be processed;

detecting that the job executed on the data to be processed is stopped due to interruption of the wireless communication with the portable terminal, which happens to occur while the data to be processed is being received;

judging whether or not portable terminals connected before and after stop of the job execution is detected, are one and the same;

requesting the reconnected portable terminal to retransmit the data to be processed, if it is judged that the portable terminals are one and the same; and resuming executing the job on the data to be processed, which is retransmitted in response to the request.

According to a sixth aspect of the present invention, a computer readable recording medium has a job execution program recorded therein to make a computer of an image processing apparatus execute:

receiving data that is transmitted by a portable terminal, wirelessly;

obtaining the data to be processed, from a storage location storing the data to be processed, based on the received data including layout information and storage information of the data to be processed;

detecting that a job executed on the data to be processed is stopped due to interruption of the wireless communication with the portable terminal;

judging whether or not portable terminals connected before and after stop of the job execution is detected, are one and the same;

continuing obtaining the data to be processed, which is stored in the storage location existing outside of the portable terminal, if the data to be processed has not yet completely been obtained by the time stop of the job execution is detected, or alternatively, continuing obtaining the data to be processed, which is stored in the storage location existing inside of the portable terminal, if the data to be processed has not yet completely been obtained by the time it is judged that portable terminals connected before and after stop of the job execution are one and the same;

layouting all the obtained data to be processed, according to the layout information; and executing a job on the layouted data to be processed.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
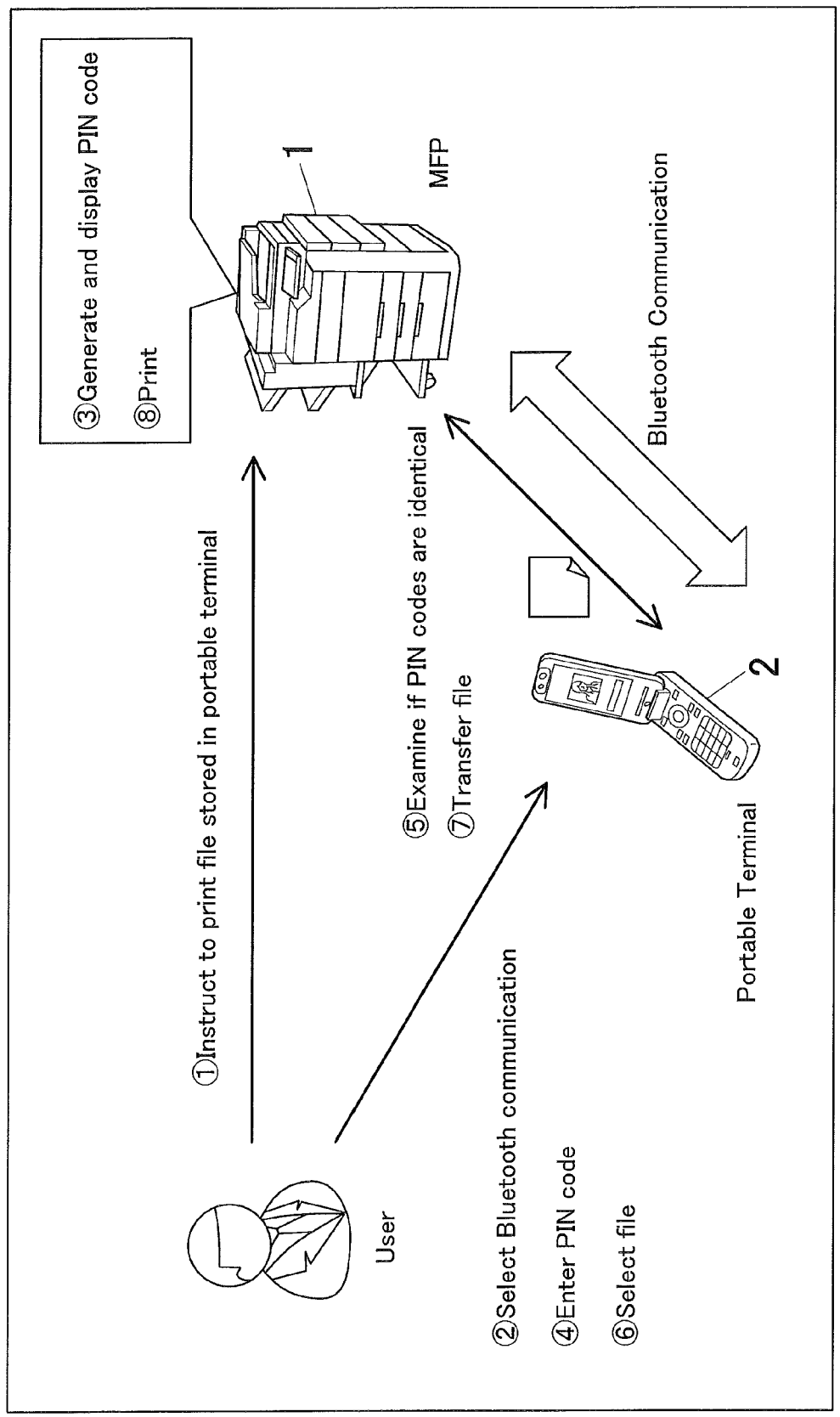
FIG. 1 is a view showing a configuration of a job execution system in which an image processing apparatus according to one embodiment of the present invention is employed.

FIG. 1 is a view showing a configuration of a job execution system, in which an image processing apparatus according to one embodiment of the present invention is employed.

This job execution system includes an image processing apparatus 1 and a portable terminal 2. In this system, a close-range wireless connection between the image processing apparatus 1 and the portable terminal 2 is established by using Bluetooth, and the image processing apparatus 1 receives the data to be processed, which is transmitted from the portable terminal 2, and executes a job according to a user instruction.

A job executed in the following embodiments is a print job, and the data to be processed, which is transmitted to the image processing apparatus 1 from the portable terminal 2 in the following embodiments, is print data. However, it is not limited to a print job. For example, it may be a facsimile transmission job or a data transmission job using e-mail or etc.

Figure 2:
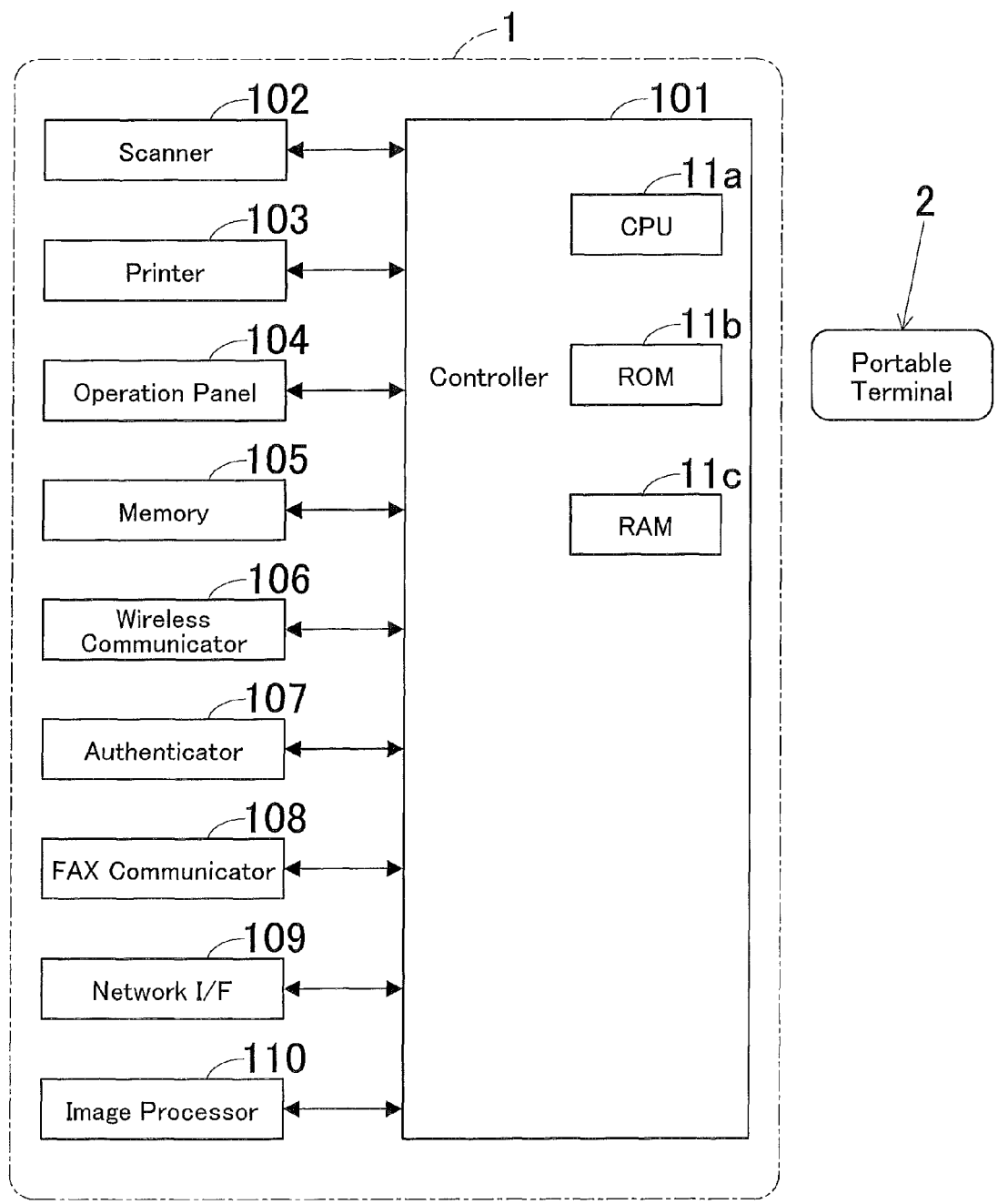
FIG. 2 is a block diagram showing a configuration of the image processing apparatus employed in the system explained with FIG. 1.

FIG. 2 is a block diagram showing a configuration of the image processing apparatus 1 employed in the system of FIG. 1. In this embodiment, as the image processing apparatus 1, a MFP that is a multifunctional digital machine collectively having many functions such as the copy function, the print function, the facsimile function and the function for transmitting data to another apparatus as described above, is employed, but the image processing apparatus 1 is not limited to a MFP. For example, it may be a copier, a printer, a facsimile or etc.

As shown in FIG. 2, the image processing apparatus 1 includes a controller 101, a scanner 102, a printer 103, an operation panel 104, a memory 105, a wireless communicator 106, an authenticator 107, a facsimile (FAX) communicator 108, a network interface (network I/F) 109, an image processor 110 and others.

The controller 101 includes a CPU 101a, a ROM 101b and a RAM 101c.

The CPU 101a centrally controls the entire image processing apparatus 1. The ROM 101b is a memory that stores in itself, an operation program for the CPU 101a and other data. The RAM 101c is a memory that provides an operation area for the CPU 101a to execute an operation program.

The scanner 102 reads an image of a document set on a platen glass or an automatic document feeder (neither shown in Figures) at a predetermined resolution, and converts it into image data that is electronic data, by performing image processing in a predetermined manner. The scanner 102 includes a light source, a prism, a CCD and others not shown in Figures.

The printer 103 prints out on sheets, image data read out from a document by the scanner 102 and print data received from external apparatuses such as the portable terminal 2 and personal computers. In this embodiment, the printer 13 functions as a job executor, and is constructed of an electrophotographic machinery, an inkjet or a thermal transfer machinery, for example.

The operation panel 104 includes a key portion having a start key, numeric keys and other keys for users to enter various instructions, and a display that is a liquid crystal display with touch-panel functionality and displays on itself messages and various entry screens for users. The display further displays on itself, identification information required to enable a wireless communication between the image processing apparatus 1 and the portable terminal 2 via the wireless communicator 106. The identification information will be further described later.

The memory 105 records in itself, various data and software, and is constructed of a hard disk drive (HDD), a nonvolatile memory or etc. The memory 105 further records in itself, information of respective jobs to be executed on print data received from the portable terminal 2. And also, if a job executed on the print data is stopped due to interruption of a wireless communication with the portable terminal 2, which happens to occur while the print data is being received from the portable terminal 2, the memory 105 records in itself, information of the stopped job execution (hereinafter, will be referred to as "job execution stop information"), which will be further described later.

Figure 3:
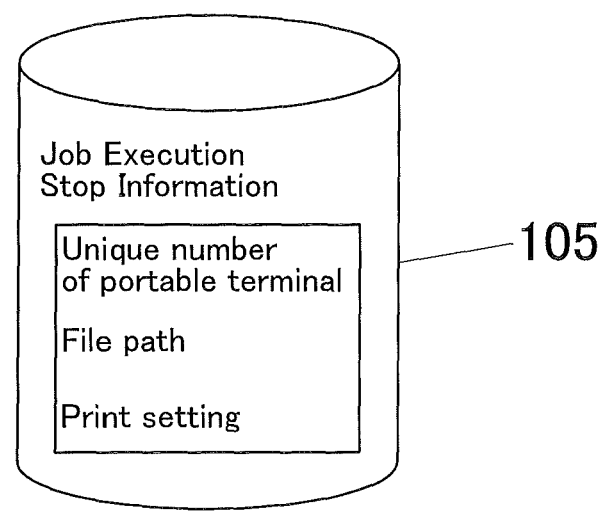
FIG. 3 is a view showing an example of job execution stop information.

FIG. 3 shows an example of the above-mentioned job execution stop information. The job execution stop information includes unique information of the portable terminal 2 that is a sender of the print data, such as a phone number thereof, a file path that indicates a storage location existing in the portable terminal 2 and storing the print data, a print setting that is a print condition specified by user, and other information.

Back to FIG. 2, the wireless communicator 106 serves to wirelessly connect the image processing apparatus 1 to a network and enable a wireless communication between the image processing apparatus 1 and the terminal apparatus 2 existing in the vicinity. In this embodiment, the wireless communicator 16 enables a wireless communication by using Bluetooth. Alternatively, it may enable a wireless communication by using a wireless communication system other than Bluetooth. Once a Bluetooth connection is established via the wireless communicator 16, the image processing apparatus 1 and the portable terminal 2 are enabled to exchange data with each other.

The authenticator 107 authenticates users who intend to log in the image processing apparatus 1. Internal authentication may be performed in the image processing apparatus 1, or external authentication may be performed by using an authentication server or etc.

The facsimile communicator 108 exchanges data by facsimile. The network interface 109 exchanges data via a network that is wiredly connected thereto and not shown in Figures.

The image processor 110 performs image processing in a predetermined manner, for example a γ correction, on image data read out by the scanner 102 or other data.

The CPU 101a executes an operation program recorded in the ROM 101b or etc., and thereby the controller 101 controls the copy operation, the print operation, the facsimile operation and other operations ordinarily expected for the functions owned by the image processing apparatus 1, and the following operations, too. That is, the controller 101 controls the operation of generating identification information required for establishment of a connection between the image processing apparatus 1 and the portable terminal 2 (identification information for connection establishment), identification information required for resumption of a job execution that is stopped due to interruption of a wireless communication with the portable terminal 2 (identification information for stopped job execution resumption), identification information required for execution of a new job (identification information for new job execution), identification information required for deletion of job information of the stopped job execution (identification information for job information deletion), and other information. In this embodiment, PIN codes are generated as the identification information, since Bluetooth is employed as a wireless communication system.

Furthermore, the controller 101 detects that a job executed on the data to be processed is stopped due to interruption of a wireless communication with the portable terminal 2, which happens to occur while print data is being received via the wireless communicator 16, and judges whether or not the portable terminals 2 connected before and after detecting stop of the job execution, are one and the same. If judges that the portable terminals 2 are one and the same, the controller 101 requests the reconnected portable terminal 2 to retransmit the print data and resumes executing the job on the retransmitted print data. Detailed explanation thereof will be provided later.

As for the print data, the image processing apparatus 1 may directly receive the print data that is transmitted from the portable terminal 2 connected to the image processing apparatus 1. Alternatively, the image processing apparatus 1 may obtain the print data by accessing a storage location according to storage information of the data to be processed, which is transmitted from the portable terminal 2. For example, the storage location storing the data to be processed may exist in a memory (for example, a hard disk) of a server, a user's personal computer or etc., and the storage information may be a path or an URL indicating an area existing in the memory and storing the data to be processed.

Figure 4:
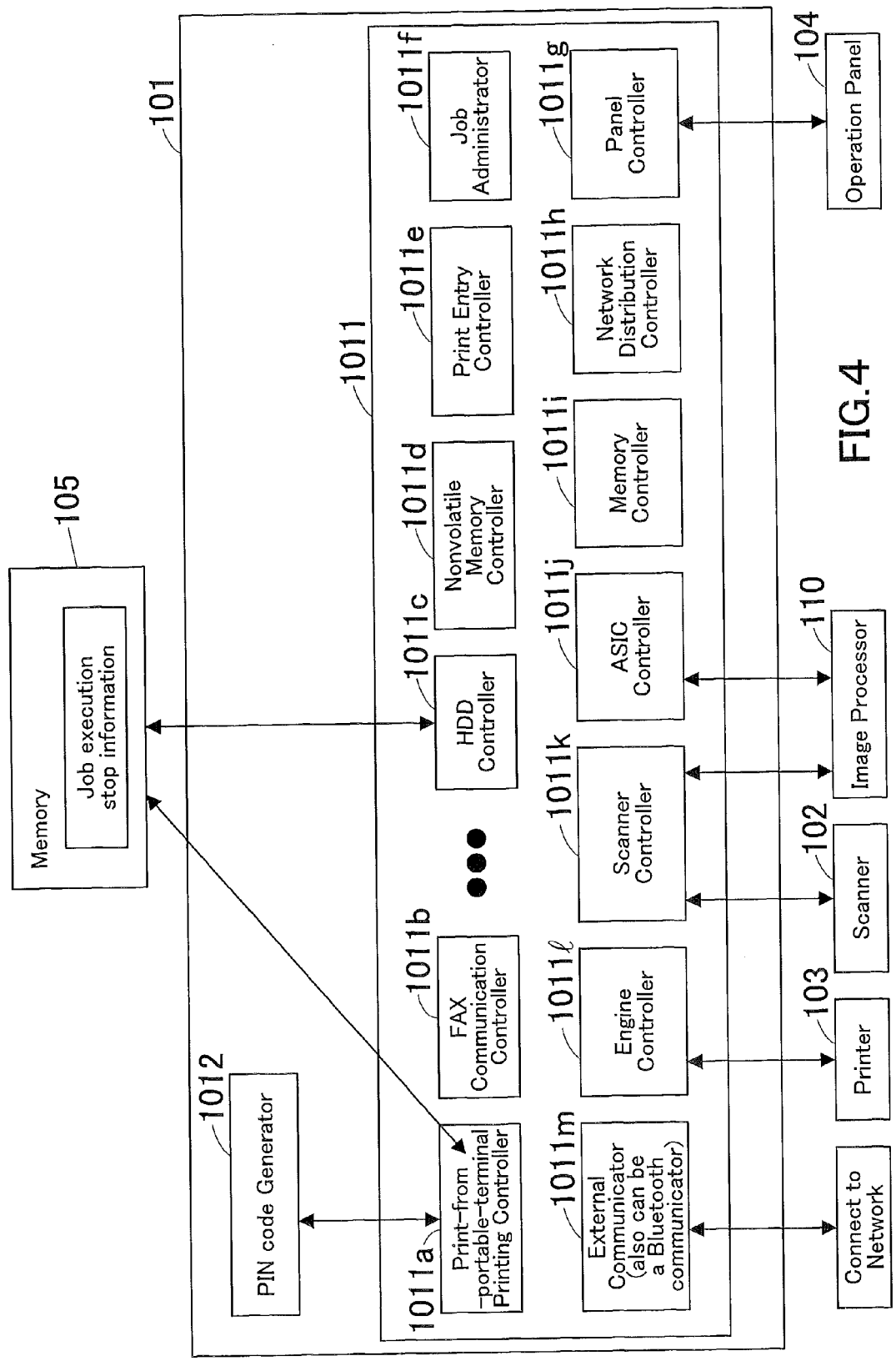
FIG. 4 is a block diagram showing a functional configuration of a controller 101 shown in FIG. 2.

FIG. 4 is a block diagram showing a functional configuration of the controller 101. This controller 101 includes a control block 1011, a PIN code generator 1012 and others.

The control block 1011 includes a print-from-portable-terminal printing controller 1011a, a FAX communication controller 1011b that controls the operation of exchanging facsimile data, a HDD controller 1011c that controls the hard disk drive, a nonvolatile memory controller 1011d that controls a nonvolatile memory other than the hard disk drive, a print entry controller 1011e, a job administrator 1011f, a panel controller 1011g that controls the operation panel 104, a network distribution controller 1011h, a memory controller 1011i, an ASIC controller 1011j, a scanner controller 1011k that controls the scanner 102, an engine controller 1011l that controls the printer 103, an external communicator 1011m that communicates via a network with external apparatuses including the portable terminal 2, and others.

The remote print controller 1011a controls all the operations performed by the print-from-portable-terminal mode that is selected to print out print data received from the portable terminal 2. For example, if a wireless communication with the portable terminal 2 happens to be interrupted, the print data is identified based on the job execution stop information stored in the memory 105, and various identification information (PIN codes) are generated by the PIN code generator 1012.

The PIN code generator 1012 generates a PIN code for connection establishment, a PIN code for stopped job execution resumption, a PIN code for new job execution and a PIN code for job information deletion, as previously mentioned, under instructions of the remote print controller 1011a.

As the portable terminal 2, a cell-phone or a PDA (Personal Digital Assistant) capable of wirelessly communicating by using Bluetooth, is employed.

Hereinafter, an overview of the operations performed in the job execution system of FIG. 1 will be explained, in which the portable terminal 2 transmits print data (also referred to as "print file" or simply as "file") to the image processing apparatus 1 to make the image processing apparatus 1 execute a print job.

As shown in FIG. 1, initially, a user selects the print-from-portable-terminal mode (instruction number ① in FIG. 1), and enters a print setting, and then selects Bluetooth as a communication system (instruction number ② in FIG. 1), by operating the operation panel 104 of the image processing apparatus 1. In this embodiment, when selecting the print-from-portable-terminal mode, the user also may enter a print setting via the operation panel 104. Alternatively, the user may enter a print setting on the portable terminal 2 and transmit it from the portable terminal 2 earlier than a print file.

And then, a PIN code for connection establishment is generated and displayed on the operation panel 104 of the image processing apparatus 1 (instruction number ③). Subsequently, the user enters the displayed PIN code on the portable terminal 2 (instruction number ④) and transmits it to the image processing apparatus 1. On the side of the image processing apparatus 1 receiving the PIN code, it is judged whether or not the generated PIN code and the received PIN code are identical (instruction number ⑤), and if the PIN codes are identical, the portable terminal 2 and the image processing apparatus 1 are enabled to perform a wireless communication by using Bluetooth.

And the user selects a print file on the portable terminal 2 (instruction number ⑥) and transmits the selected file to the image processing apparatus 1 (instruction number ⑦). Then the print file is printed according to the print setting (instruction number ⑧).

Hereinafter, an overview of the operations performed if a job executed on a print file is stopped due to interruption of a wireless communication between the image processing apparatus 1 and the portable terminal 2, which happens to occur while the portable terminal 2 is transferring the print file to the image processing apparatus 1, will be explained with reference to FIG. 5.

Figure 5:
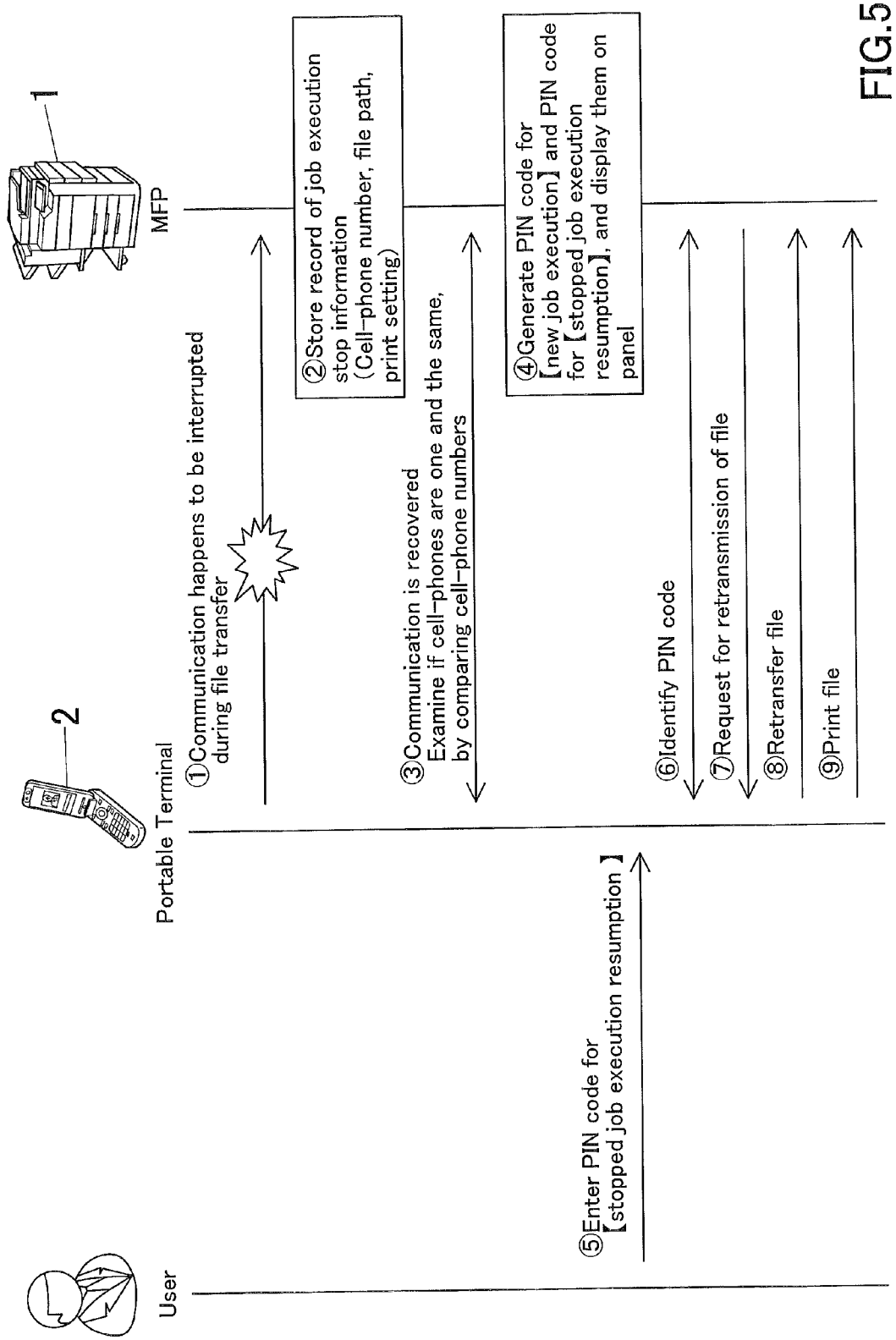
FIG. 5 is a view to explain an overview of the operations that are performed if a wireless communication between the image processing apparatus and a portable terminal happens to be interrupted while a print file is being transferred to the image processing apparatus therefrom.

If interruption of a wireless communication is detected while a print file stored in the portable terminal 2 is being transferred to the image processing apparatus 1 (instruction number ① in FIG. 5), a record of job execution stop information is stored in the memory 105 of the image processing apparatus 1 (instruction number ② in FIG. 5). As previously described, the job execution stop information includes a phone number that is unique information of the portable terminal 2 related to the stopped job execution, a file path that indicates a storage location existing in the portable terminal 2 and storing the print file, and a print setting.

As soon as a wireless communication between the image processing apparatus 1 and the portable terminal 2 is recovered, the phone number included in the job execution stop information and a phone number of the currently connected portable terminal 2 are compared to each other, and thereby it is judged that the portable terminal 2 connected before stop of the job execution and the currently connected portable terminal 2 are one and the same (instruction number ③).

And then, a PIN code for new job execution and a PIN code for stopped job execution resumption are displayed on the operation panel 104 of the image processing apparatus 1 (instruction number ④).

For example, the user enters the PIN code for stopped job execution resumption on the portable terminal 2 (instruction number ⑤) and transmits the entered PIN code to the image processing apparatus 1 from the portable terminal 2. On the side of the image processing apparatus 1, the PIN code is identified (instruction number ⑥). And a request for retransmission of the print file is transmitted to the portable terminal 2, together with the file path (instruction number ⑦).

In response to the retransmission request, the print file is retransferred by the portable terminal 2 (instruction number ⑧). On the side of image processing apparatus 1 receiving the print file, the print file is printed according to the print setting included in the job execution stop information (instruction number ⑨).

Figure 6:
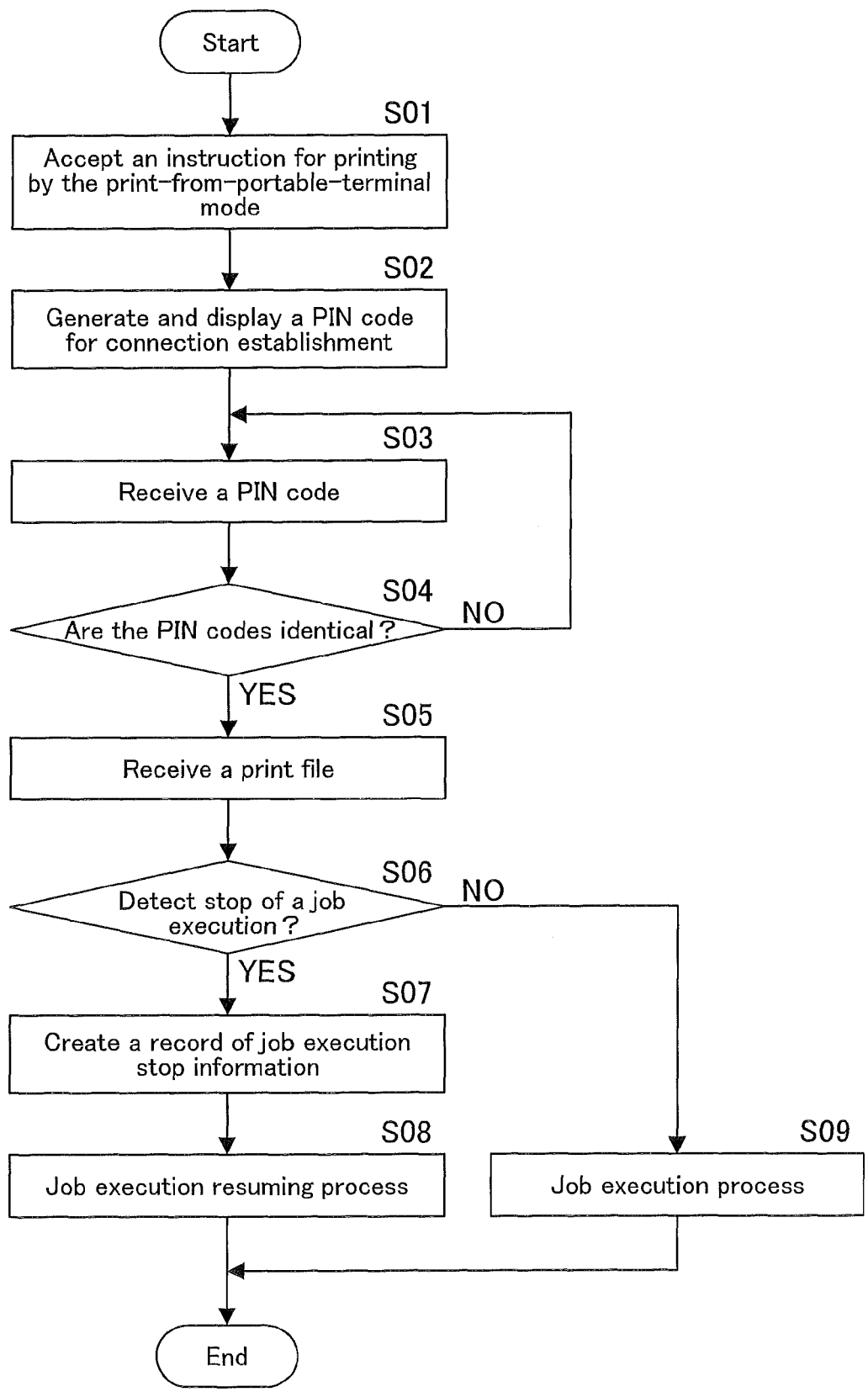
FIG. 6 is a flowchart representing a procedure executed in the image processing apparatus, to perform a print operation by the print-from-portable-terminal mode.

FIG. 6 is a flowchart representing a procedure executed in the image processing apparatus 1, to perform a print operation by the print-from-portable-terminal mode. This procedure is executed by the CPU 101a of the controller 101 of the image processing apparatus 1, according to an operation program stored in a recording medium such as the ROM 101b.

Figure 8A:
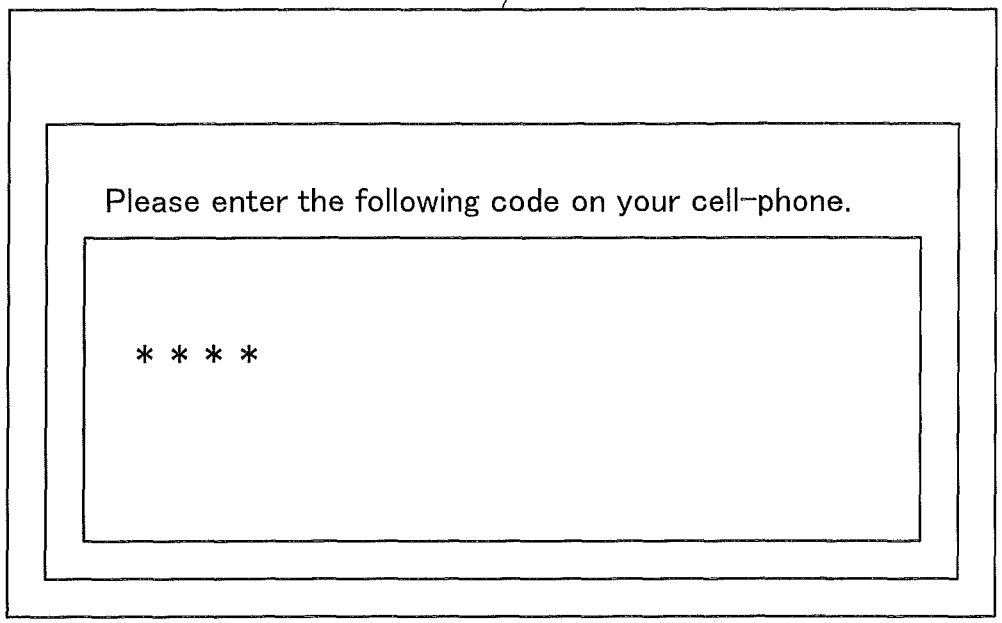
FIG. 8 shows a generated PIN code displayed in a display screen of an operation panel.

In Step S01, the print-from-portable-terminal mode selected by a user is accepted. And in Step S02, a PIN code for connection establishment is generated, and as shown in FIG. 8(a), it is displayed on the operation panel 104, together with a message requesting to enter the PIN code on the portable terminal 2. When selecting the print-from-portable-terminal mode, the user also may enter a print setting via the operation panel 104 of the image processing apparatus 1.

And the user enters the displayed PIN code on the portable terminal 2 and transmits it to the image processing apparatus 1. In Step S03, the PIN code is received. After that, it is judged in Step S04, whether or not the received PIN code and the generated PIN are identical.

If those are not identical (NO in Step S04), the routine waits until an appropriate PIN code is received in Step S03.

If those are identical (YES in Step S04), a connection between the image processing apparatus 1 and the portable terminal 2 is established. Thus in Step S05, a print file is received from the portable terminal 2. Earlier than the print file, the print setting may be transmitted form the portable terminal 2 and received by the image processing apparatus.

In Step S06, it is judged whether or not interruption of a wireless communication between the image processing apparatus 1 and the portable terminal 2 (stop of a job execution) is detected. If stop of a job execution is detected (YES in Step S06), a phone number of the portable terminal 2 and a print setting are stored in the memory 105 as a record of job execution stop information, in Step S07. After that, a job execution resuming process is performed in Step S08. Meanwhile, if the print file is successfully received without stop of a job execution (NO in Step S06), the received print file is printed by the printer 103, according to the print setting determined by the user, in Step S09.

Figure 7:
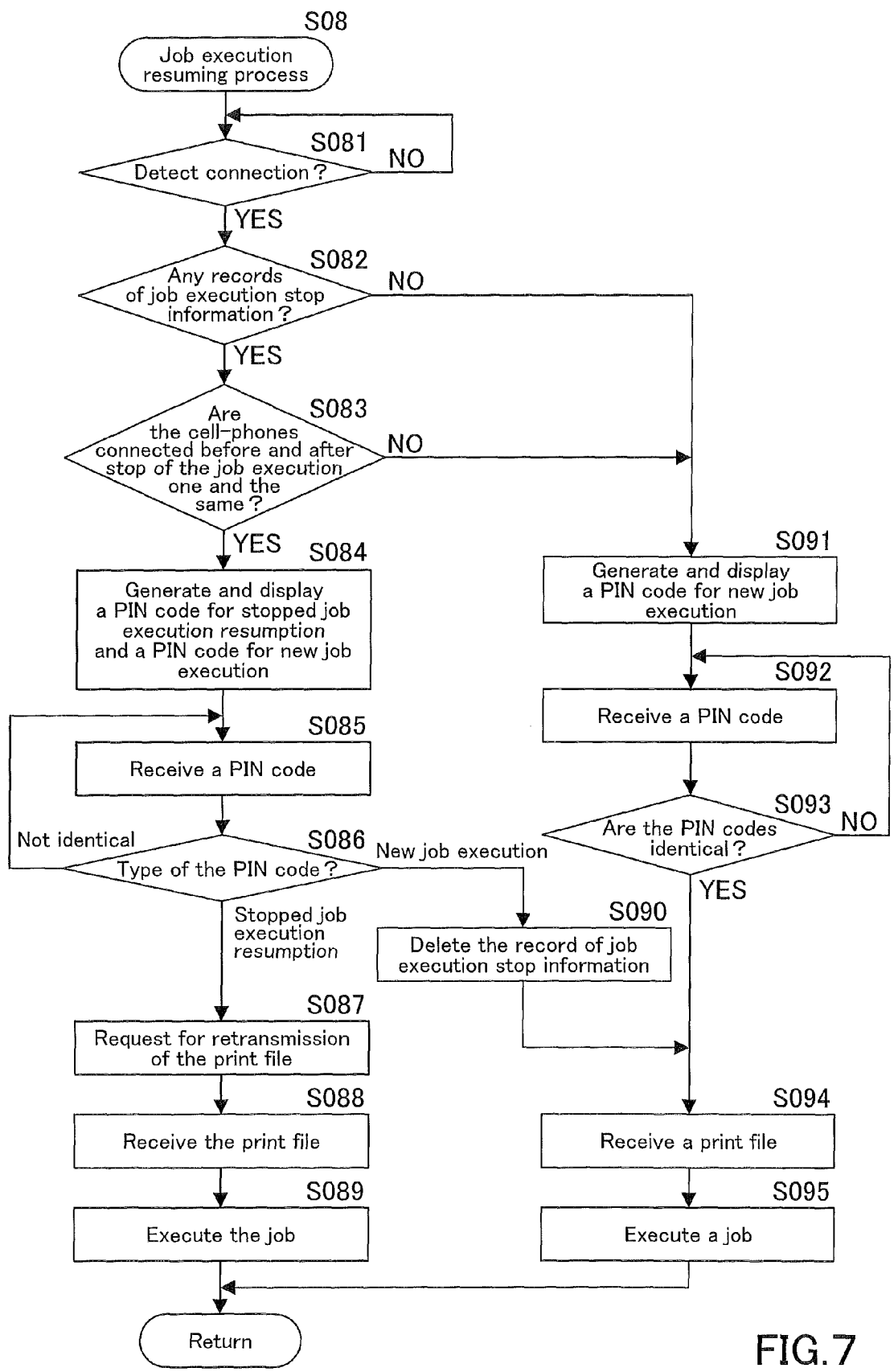
FIG. 7 is a flowchart representing a job execution resuming process that corresponds to Step S07 of FIG. 6.

FIG. 7 is a flowchart representing the job execution resuming procedure that corresponds to Step S08 of FIG. 6.

In Step S081, it is judged whether or not a connection with the portable terminal 2 is detected. If it is not detected (NO in Step S081), the routine waits until such a connection is detected. If it is detected (YES in Step S081), then it is judged in Step S082, whether or not there stored in the memory 105 any records of job execution stop information.

If there stored a record of job execution stop information (YES in Step S082), then it is judged in Step S083, whether or not a phone number of the portable terminal 2, which is included in the job execution stop information, in other words, a phone number of the portable terminal 2 connected before stop of the job execution, and a phone number of the currently connected portable terminal 2 are identical. If those are identical (YES in Step S083), the routine proceeds to Step S084.

Figure 8B:
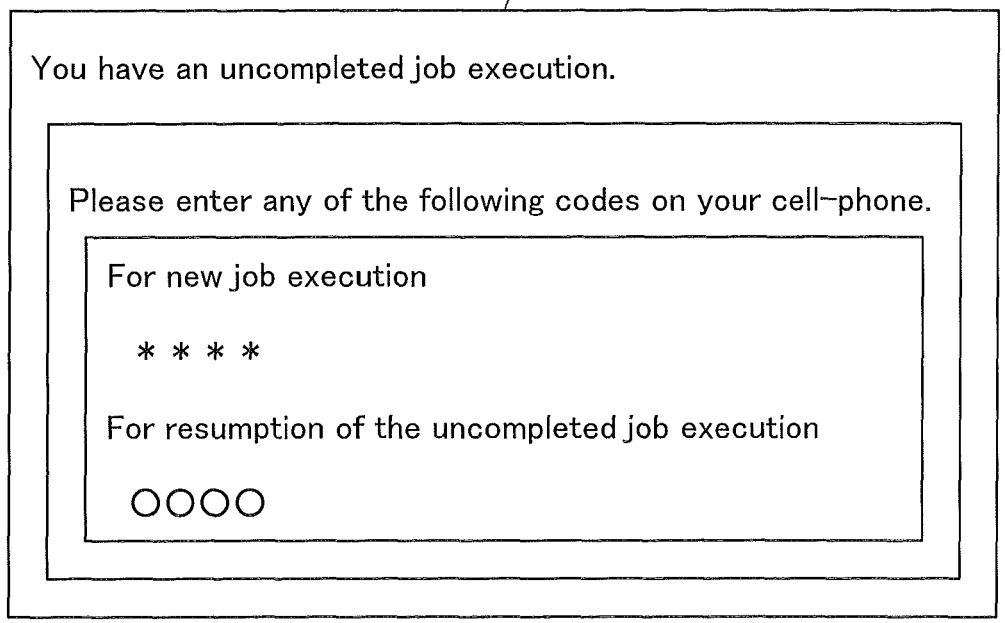

In Step S084, a PIN code for stopped job execution resumption and a PIN code for new job execution are generated, and as shown in FIG. 8(*b*), the generated PIN codes are displayed on the operation panel 104, together with a message notifying of existence of a stopped print job execution and a message requesting to enter any of the PIN codes on the portable terminal 2.

And the user enters any of the displayed PIN codes on the portable terminal 2 and transmits it to the image processing apparatus 1. In Step S085, the PIN code transmitted from the portable terminal 2 is received by the image processing apparatus 1. After that, a type of the PIN code is examined in Step S086.

If the PIN code is for stopped job execution resumption ("stopped job execution resumption" in Step S086), the routine proceeds for resumption of the stopped job execution. More concretely, in Step S087, a request for retransmission of the print file is transmitted to the portable terminal 2, together with a file path indicating a storage location existing in the portable terminal 2 and storing the print file, which is included in the job execution stop information. After that, the retransmitted print file is received in Step S088 and the job is executed in Step S089. More concretely, the print file is printed according to the print setting stored in the job execution stop information. After printing, the record of job execution stop information is deleted.

Meanwhile in Step S086, if the PIN code is for new job execution ("new job execution" in Step S086), the record of job execution stop information is deleted in Step S090, then the routine proceeds for a new job execution. More concretely, a print file is received in Step S094, and in Step S95, a job is executed, i.e. the print file is printed according to the print setting determined by the user.

In Step S086, if the received PIN code is not identical with any of the PIN codes generated in Step S084 ("not identical" in Step S086), the routine goes back to Step S085 and waits until another PIN code is received.

Meanwhile, if there stored no record of job execution stop information in Step S082 (NO in Step S082), and if the phone numbers are not identical in Step S083 (NO in Step S083), the routine proceeds to Step S091, in which a PIN code for new job execution is generated, and as shown in FIG. 8(*a*), it is displayed on the operation panel 104, together with a message requesting to enter the PIN code on the portable terminal 2.

And the user enters the displayed PIN code on the portable terminal 2 and transmits it to the image processing apparatus 1. In Step S092, the PIN code transmitted from the portable terminal 2 is received by the image processing apparatus 1.

After that, it is judged in Step S093, whether or not the received PIN code and the PIN code generated in Step S091 are identical.

If those are not identical (NO in Step S093), the routine goes back to Step S092 and waits until another PIN code is received. If those are identical (YES in Step S093), a print file is received in Step S094, then a job is executed in Step S095.

As described above in this embodiment, if a job executed on the data to be processed is stopped due to interruption of a wireless communication between the image processing apparatus 1 and the portable terminal 2, which happens to occur while the image processing apparatus 1 is receiving the print file from the portable terminal 2, it is examined if the portable terminals 2 connected before and after stop of the job execution are one and the same, and the portable terminal 2 is requested to retransmit the print file. And then, the job is executed again on the print file that is retransmitted therefrom.

Briefly, when a wireless communication between the image processing apparatus 1 and the portable terminal 2 is recovered after interruption that happens to occur while the image processing apparatus 1 is receiving the print file from the portable terminal 2, the print file is automatically retransmitted from the portable terminal 2, in response to a retransmission request issued by the image processing apparatus 1. And thus, a user using the portable terminal 2 does not have to start all over again the operation of transmitting the print file to the image processing apparatus 1, which would improve usability.

Furthermore, in this embodiment, a request for retransmission of the print file is transmitted to the portable terminal 2, together with a file path indicating a storage location storing the print file. This facilitates the operation of identifying the print file, which is performed by the portable terminal 2. And also, since the print file retransmitted after stop of the job execution is printed according to a print setting included in the job execution stop information in the memory 105, the user does not have to enter the print setting again.

Furthermore, if there stored a record of job execution stop information, a PIN code for stopped job execution resumption and a PIN code for new job execution are generated and displayed. Thus, the user can select "stopped job execution resumption" or "new job execution", and more flexibility is allowed for user selection, which also would improve usability.

Figure 9:
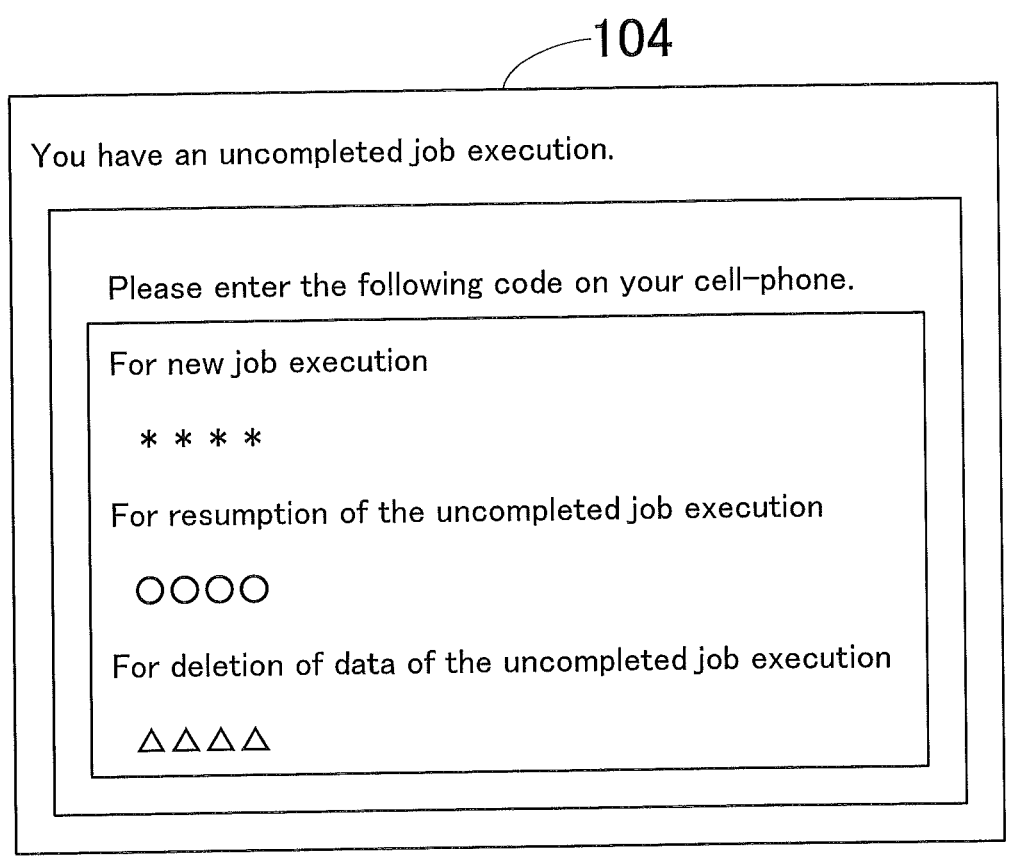
FIG. 9 shows a PIN code for deletion of stopped job execution is additionally displayed in a display screen of the operation panel.

FIG. 9 shows another embodiment of the present invention.

In the example of FIG. 7, two PIN codes for stopped job execution resumption and for new job execution are generated and displayed in Step S084. Meanwhile, in the example of FIG. 9, in addition to the two PIN codes, another PIN code for deletion of job execution stop information is also generated and displayed.

In this example, when a user enters the displayed PIN code for deletion of job execution stop information on the portable terminal 2 and transmits it to the image processing apparatus 1, the image processing apparatus 1 deletes the corresponding record of job execution stop information stored in the memory 105.

Figure 10:
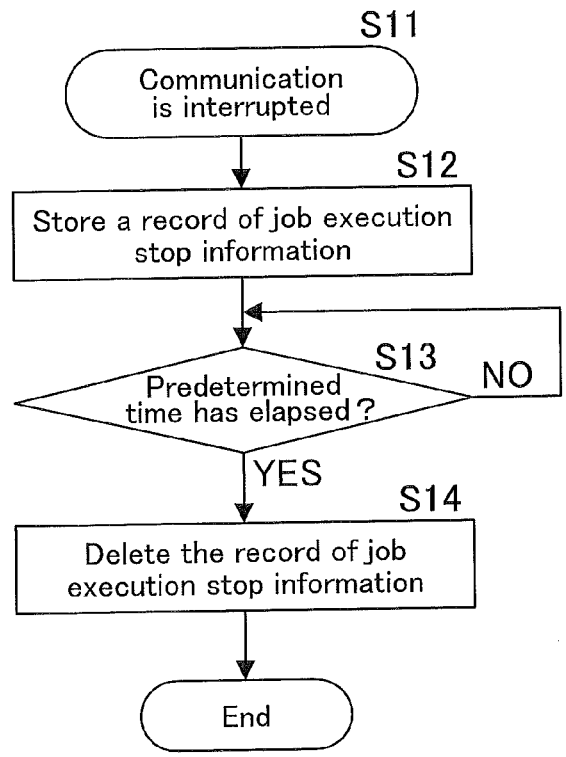
FIG. 10 shows another embodiment of the present invention, and is a flowchart representing a procedure executed in the image processing apparatus.

FIG. 10 shows yet another embodiment of the present invention. In this embodiment, if the portable terminal 2 is not reconnected after interruption of a wireless communication between the image processing apparatus 1 and the portable terminal 2, a record of job execution stop information is deleted after a lapse of a predetermined time.

A communication is interrupted in Step S11. The image processing apparatus 1 stores a record of job execution stop information in Step S12, and judges in Step S13, whether or not a predetermined time has elapsed. If a predetermined time has not elapsed yet (NO in Step S13), the routine waits until it has elapsed. If a predetermined time has elapsed (YES in Step S13), the record of job execution stop information is deleted in Step S14.

As described above, if a predetermined time has elapsed after interruption of a wireless communication (stop of a job execution), the record of job execution stop information stored in the memory 105 is deleted. This would eliminate an inconvenience such that the memory capacity of the memory 105 is unnecessarily occupied for a long time due to existence of the record of job execution stop information.

Figure 11:
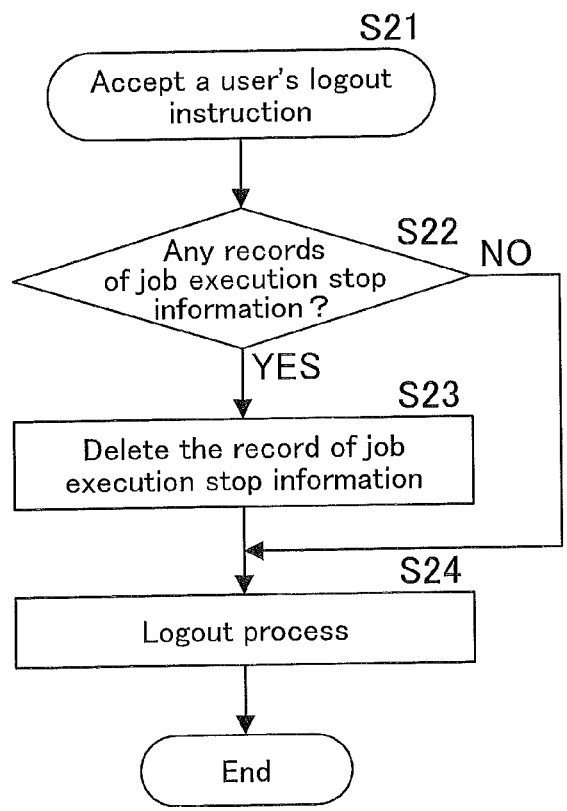
FIG. 11 shows yet another embodiment of the present invention, and is a flowchart representing a procedure executed in the image processing apparatus.

FIG. 11 shows still yet another embodiment of the present invention. If there stored a record of job execution stop information related to a user using the image processing apparatus 1 that allows to be used only by users authenticated by the authenticator 107, when the user issues a logout instruction, the record of job execution stop information is deleted. Meanwhile, when a user is authenticated and logs in the image processing apparatus 1, user information and a record of job execution stop information are related to each other and stored.

In Step S21, the image processing apparatus 1 accepts a logout instruction issued by a user. Then it is judged in Step S22, whether or not there stored a record of job execution stop information related to this user. If such a record of job execution stop information is stored (YES in Step S22), it is deleted in Step S23, then a logout process is performed in Step S24. If such a record of job execution stop information is not stored (NO in Step S22), the routine directly proceeds to Step S24, in which a logout process is performed.

As described above, if a login user allowed to use the image processing apparatus 1 by user authentication, logs out due to stop of a job execution, the record of job execution stop information is deleted. Thus, even if the user logs out without implementation of the job execution resuming process, the record of job execution will not be leaked to a third person, which would ensure higher security.

Figure 12:
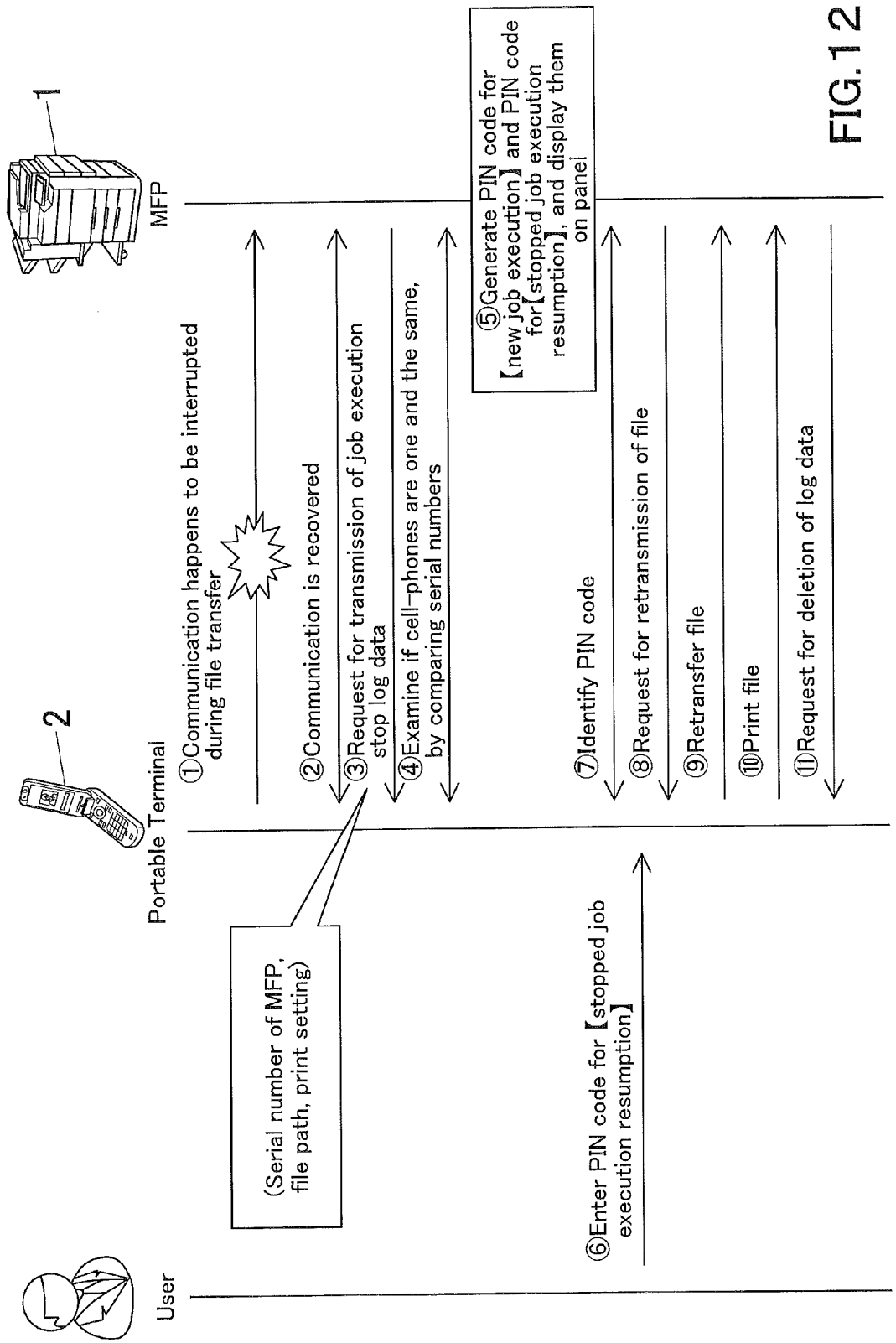
FIG. 12 is a view to explain an overview of the operations performed in this embodiment of the present invention.
Figure 13:
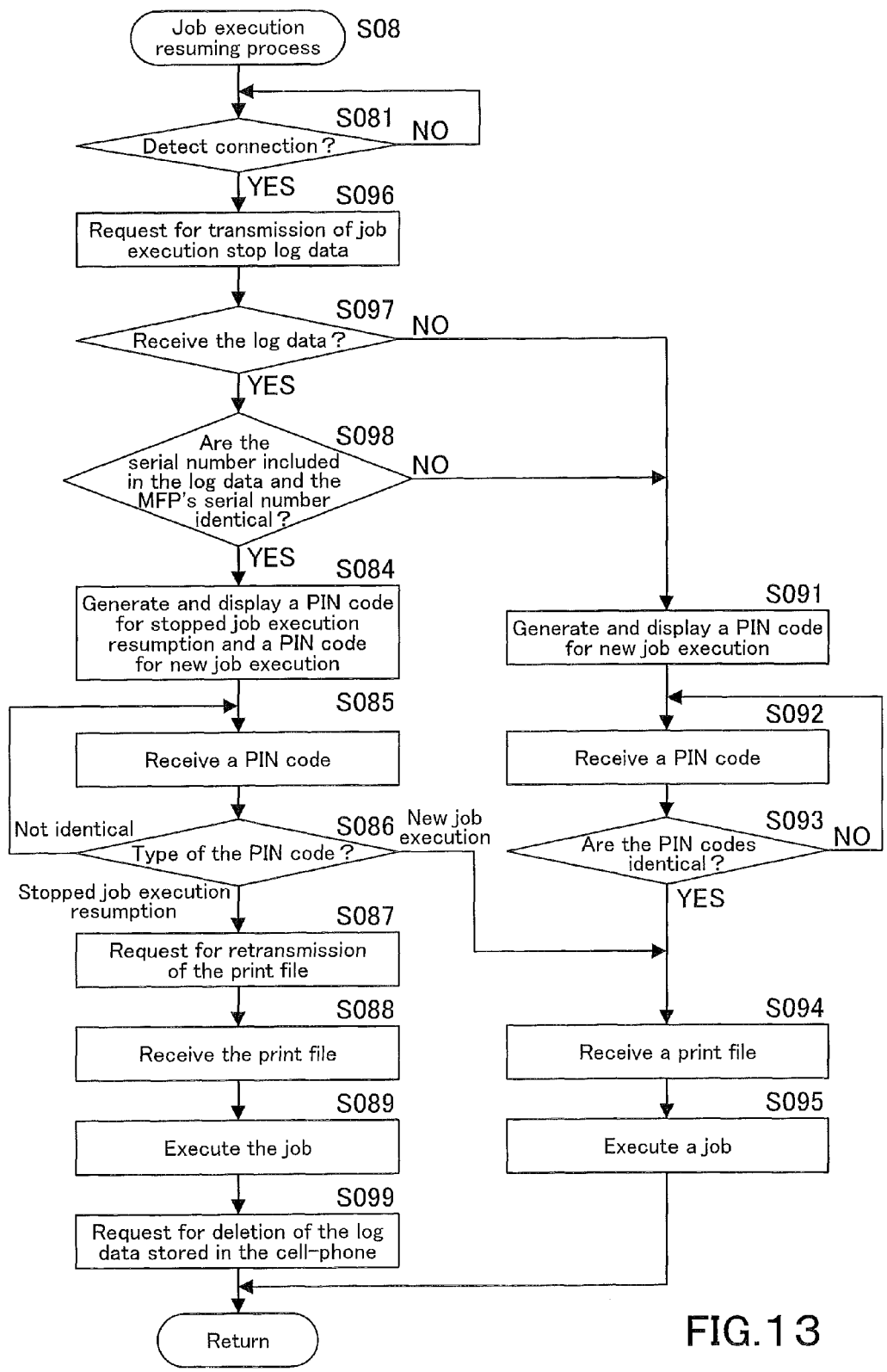
FIG. 13 is a flowchart representing a job execution resuming procedure executed by the CPU of the image processing apparatus, in the embodiment explained with FIG. 12.
Figure 14:
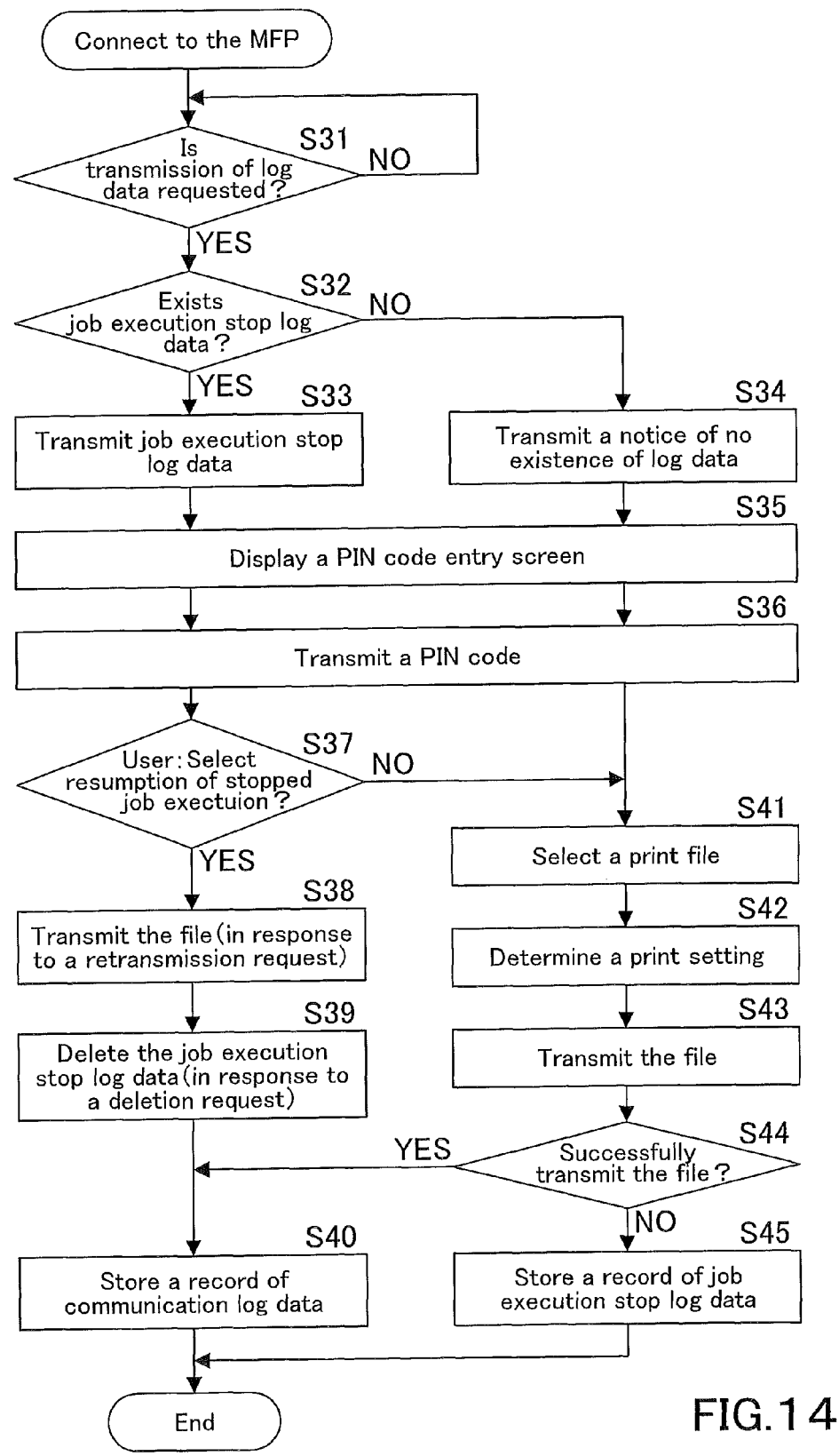
FIG. 14 is a flowchart representing a procedure executed in the portable terminal connected to the image processing apparatus, in the embodiment explained with FIG. 12.

FIG. 12 through FIG. 14 show further still yet another embodiment of the present invention. In this embodiment, the image processing apparatus 1 obtains transmission log information from the reconnected portable terminal 2, and based on the transmission log information, identifies the print file that couldn't be completely received, and then requests the portable terminal 2 to retransmit the print file.

FIG. 12 is a view to explain an overview of the operations performed in this embodiment of the present invention.

If a wireless communication happens to be interrupted while a print file stored in the portable terminal 2 is being transferred to the image processing apparatus 1 (instruction number ① in FIG. 12), a record of job execution stop log (will be referred to as "job execution stop log data") is generated in the portable terminal 2. The job execution stop log data includes a serial number of the image processing apparatus 1 just having lost a communication, a file path that indicates a storage location storing the print file, and a print setting.

When a communication between the image processing apparatus 1 and the portable terminal 2 is recovered (instruction number ② in FIG. 12), the image processing apparatus 1 requests the portable terminal 2 to transmit job execution stop log data (instruction number ③). On the side of the image processing apparatus 1, the serial number of the image processing apparatus 1, which is included in the received job execution stop log data and a serial number of the image processing apparatus 1 are compared to each other, and thereby it is judged that the portable terminal 2 connected before stop of the job execution and the currently connected portable terminal 2 are one and the same (instruction number ④).

And then, a PIN code for new job execution and a PIN code for stopped job execution resumption are generated and displayed on the operation panel 104 of the image processing apparatus 1 (instruction number ⑤).

For example, the user enters the PIN code for stopped job execution resumption on the portable terminal 2 (instruction number ⑥) and transmits the entered PIN code to the image processing apparatus 1 from the portable terminal 2. On the side of the image processing apparatus 1, the PIN code is identified (instruction number ⑦). And a request for retransmission of the print file is transmitted to the portable terminal 2, together with the file path included in the job execution stop log data.

In response to the retransmission request, the print file is retransferred by the portable terminal 2 (instruction number ⑨). On the side of image processing apparatus 1 receiving the print file, the print file is printed according to the print setting included in the job execution stop log data (instruction number ⑩).

After printing, the image processing apparatus 1 requests the portable terminal 2 to delete the job execution stop log data (instruction number ⑪).

FIG. 13 is a flowchart representing a job execution resuming procedure executed by the CPU 101a of the image processing apparatus 1 in the embodiment explained with FIG. 12, corresponding to the job execution resuming process of FIG. 7.

In Step S081, it is judged whether or not a connection with the portable terminal 2 is detected. If such a connection is not detected (NO in Step S081), the routine waits until it is detected. If such a connection is detected (YES in Step S081), the portable terminal 2 is requested to transmit job execution stop log data, in Step S096.

Subsequently in Step S097, it is judged whether or not job execution stop log data is received from the portable terminal 2. If it is received (YES in Step S097), then it is judged in Step S098, whether or not the portable terminal 2 connected before stop of the job execution and the currently connected portable terminal 2 are one and the same, by comparing to each other, the serial number of the image processing apparatus 1, which is included in the log data, and a serial number of the image processing apparatus 1. If the portable terminals 2 are one and the same (YES in Step S098), the routine proceeds to Step S084.

In Step S084, a PIN code for stopped job execution resumption and a PIN code for new job execution are generated, and as shown in FIG. 8(a), they are displayed on the operation panel 104, together with a message notifying of existence of a stopped job execution and a message requesting to enter any of the PIN codes on the portable terminal 2.

And the user enters any of the displayed PIN codes on the portable terminal 2 and transmits it to the image processing apparatus 1. In Step S085, the PIN code transmitted from the portable terminal 2 is received by the image processing apparatus 1. After that, a type of the PIN code is examined in Step S086.

If the PIN code is for stopped job execution resumption ("stopped job execution resumption" in Step S086), the routine proceeds for resumption of the stopped job execution. More concretely, in Step S087, a request for retransmission of the print file is transmitted to the portable terminal 2, together with a file path indicating a storage location storing the original print file, which is included in the job execution stop log data. And that, the retransmitted print file is received in Step S088, and the print job is executed according to the print setting included in the job execution stop log data, in Step S089.

After printing, the portable terminal 2 is requested to delete the job execution stop log data, in Step S099.

Meanwhile in Step S086, if the PIN code is for new job execution ("new job execution" in Step 086), the routine proceeds for a new job execution. More concretely, a print file is received in Step S094, and a job is executed in Step S095.

In Step S086, if the received PIN code is not identical with any of the PIN codes generated in Step S084 ("not identical" in Step S086), the routine goes back to Step S085 and waits until another PIN code is received.

If there stored no job execution stop log data in the portable terminal 2 and no job execution stop log data is received from the portable terminal 2 (NO in Step S097), and if the serial numbers of the image processing apparatus 1 are not identical (NO in Step S098), the routine proceeds to Step S091, in which a PIN code for new job execution is generated, and as shown in FIG. 8(*a*), it is displayed on the operation panel 104, together with a message requesting to enter the PIN code on the portable terminal 2.

And the user enters the generated PIN code on the portable terminal 2 and transmits it to the image processing apparatus 1. In Step S092, the PIN code transmitted from the portable terminal 2 is received by the image processing apparatus 1. After that, it is judged in Step S093, whether or not the received PIN code and the PIN code generated in Step S091 are identical.

If those are not identical (NO in Step S093), the routine goes back to Step S092 and waits until another PIN code is received. If those are identical (YES in Step S093), a print file and a print setting are received in Step S094, and a job is executed in Step S095.

FIG. 14 is a flowchart representing a procedure executed in the portable terminal 2 connected to the image processing apparatus 1, in the embodiment explained with FIG. 12.

In Step S31, it is judged whether or not transmission of job execution stop log data is requested by the image processing apparatus 1. If it is not requested (NO in Step S31), the routine waits until it is requested. If it is requested (YES in Step S31), then it is judged in Step S32, whether or not there exists job execution stop log data. If there exists (YES in Step S32), the job execution stop log data is transmitted to the image processing apparatus 1 in Step S33, then the routine proceeds to Step S035. If there does not exists job execution stop log data (NO in Step S32), a notice of no existence of job execution stop log data is transmitted to the image processing apparatus 1 in Step S34. After that, the routine proceeds to Step S35.

In Step S35, a PIN code entry screen is displayed to allow the user to enter a PIN code generated and displayed by the image processing apparatus 1. And the PIN code is transmitted to the image processing apparatus 1 in Step S36.

If there does not exist job execution stop log data and the transmitted PIN code is for new job execution, the routine proceeds to Step S41, in which a print file is selected. And a print setting is determined in Step S42, then the print setting and the print file are transmitted in Step S43.

Subsequently in Step S44, it is judged whether or not the file is successfully transmitted. If it is successfully transmitted (YES in Step S44), a record of communication log is stored in Step S40. If it is not successfully transmitted (NO in Step S44), a record of job execution stop log data is stored in Step S45.

Meanwhile, if the PIN code transmitted in Step S36 is for stopped job execution resumption and is not for new job execution (YES in Step S37), then in Step S38, a specified file is transmitted to the image processing apparatus 1 in response to a retransmission request issued by the image processing apparatus 1. And in Step S39, the job execution stop log related to the specified file is deleted in response to a deletion request also issued by the image processing apparatus 1, and a record of communication log is stored in Step S40. Meanwhile, if the PIN code transmitted in Step S36 is for new job execution (NO in Step S37), the routine proceeds to Step S41, in which another print file is transmitted.

In the embodiment explained with FIG. 12 through FIG. 14, the image processing apparatus 1 receives job execution stop log data from the reconnected portable terminal 2, and the portable terminal 2 is requested to retransmit a print file that was not successfully received, based on the received log data. Thus, information to identify the print file is not necessarily stored in the image processing apparatus 1.

Figure 15:
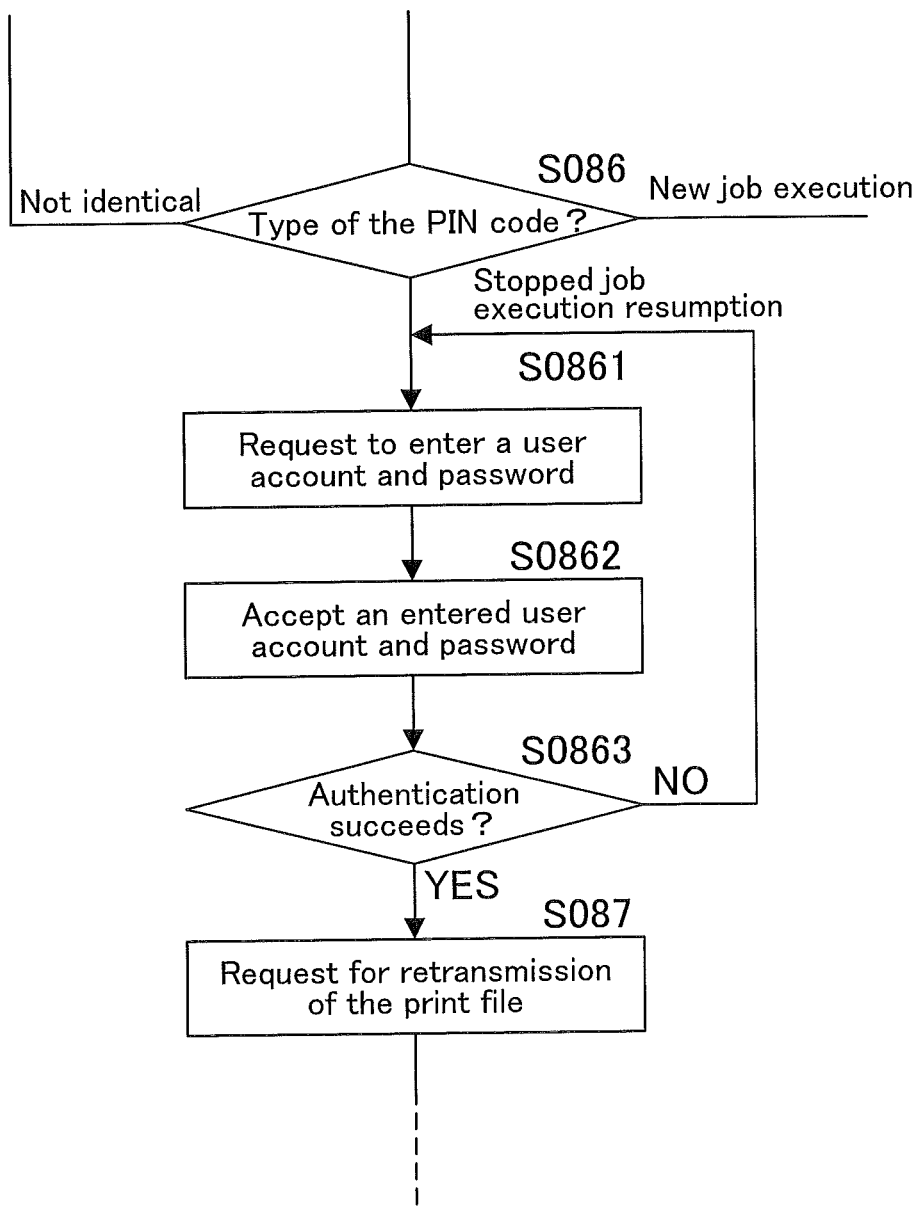
FIG. 15 is a flowchart executed in still yet another embodiment of the present invention.

FIG. 15 is a flowchart executed in further still yet another embodiment of the present invention. In this embodiment, if the image processing apparatus 1 that allows to be used only by users authenticated by the authenticator 107, receives a PIN code for stopped job execution resumption from the portable terminal 2, the stopped job execution cannot be resumed without implementation of another user authentication. This flowchart corresponds to Steps S086 and S087 shown in FIG. 7.

In Step S086, if the PIN code received by the image processing apparatus 1 is for stopped job execution resumption, the routine proceeds to Step S0861, in which the image processing apparatus 1 requests for entry of a user account and a password for user authentication. And an entered user account and password are accepted in Step S0862, then it is judged in Step S0863, whether or not authentication succeeds. If authentication succeeds (YES in Step S0863), retransmission of the print file is requested and the stopped job execution is resumed, in Step S0877. If authentication fails (NO in Step S0863), the routine goes back to Step S0861, in which re-entry of a user account and a password is requested.

As described above, retransmission of a print file is requested if a user is authenticated again and logs in the image processing apparatus 1 before retransmission of a print file is requested. This could eliminate the inconvenience that the data to be processed is unfavorably retransmitted even though the user is not authenticated again, and ensure higher security.

Figure 16:
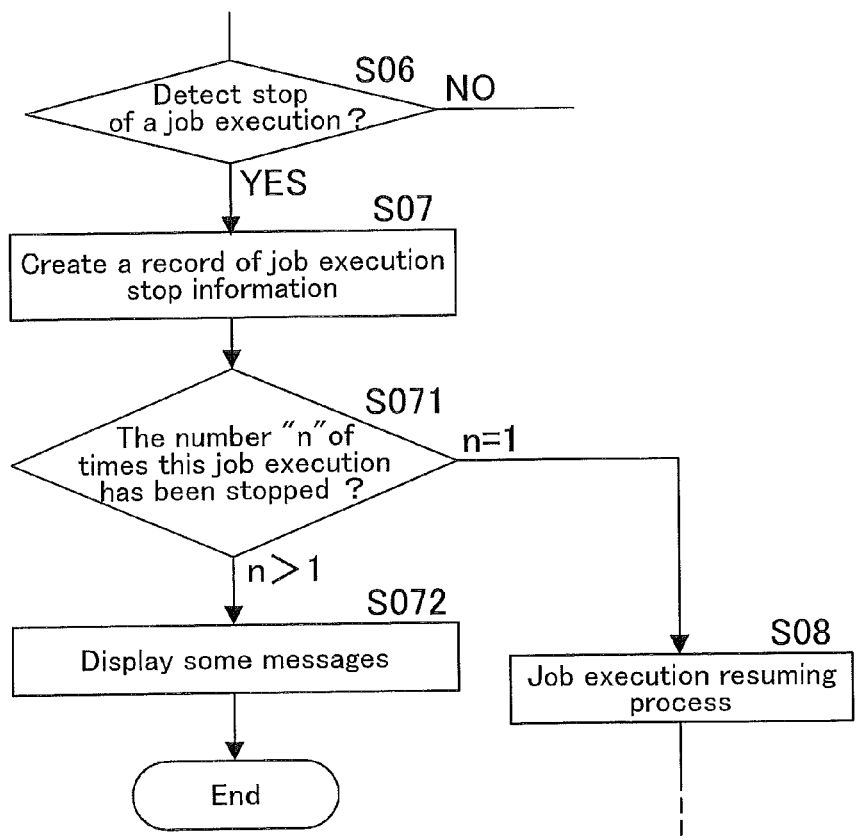
FIG. 16 is a flowchart executed in further still yet another embodiment of the present invention.

FIG. 16 shows further still yet another embodiment of the present invention. In this embodiment, if interruption of a wireless communication between the image processing apparatus 1 and the portable terminal 2 happens to occur again while the image processing apparatus 1 is receiving a print file that is retransmitted by the portable terminal 2 in response to the retransmission request, in other words, if one print file could not be successfully transferred more than once, a message including an instruction against the interruption is provided to a user.

The flowchart shown in FIG. 16 corresponds to Steps S06 through S08 of FIG. 6.

In Step S06, if stop of a job execution is detected (YES in Step S06), a record of job execution stop information is created and stored in the memory 105, in Step S07. After that, it is judged in Step S071, whether or not the number of times this job execution has been stopped is "1". If it is "1" ("n=1" in Step S071), the routine proceeds to Step S08, in which the job execution resumption procedure is executed as explained with FIG. 7.

Figure 17:
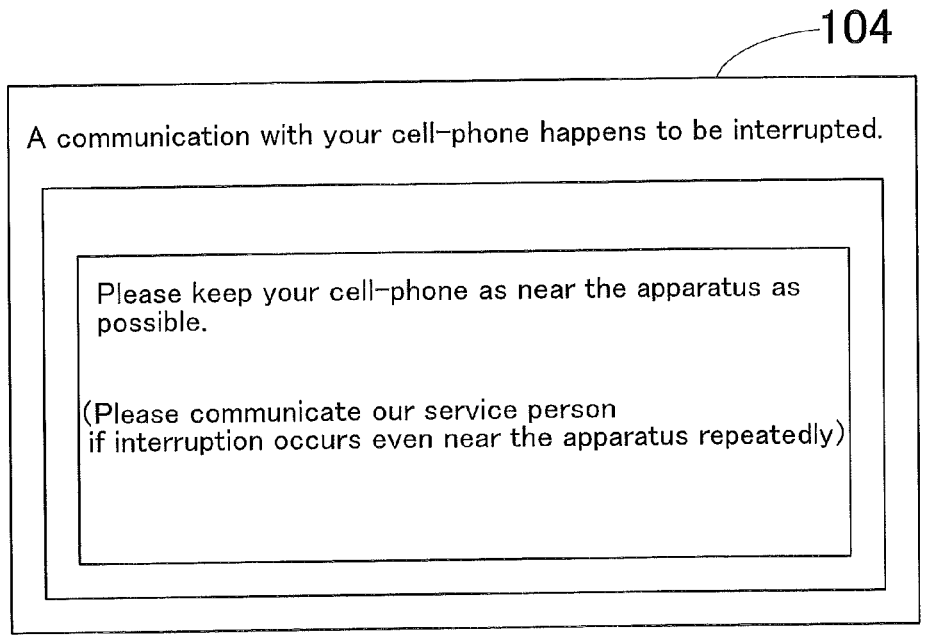
FIG. 17 is a view showing an example of the messages displayed on the operation panel, if one job execution has been stopped more than once.

In Step S071, if it is not "1" ("n>1" in Step S062), some messages are displayed on the operation panel 104 of the image processing apparatus 1, in Step S072. For example, the messages are a notice of interruption of a communication with the portable terminal 2, an advice to keep the portable terminal 2 as near the image processing apparatus 1 as possible, and an advice to communicate a service person if interruption occurs even near the apparatus repeatedly, as shown in FIG. 17.

As described above, messages are provided to a user if one job execution has been stopped more than once. Thus, it is convenient that the user only has to do as instructed by the messages.

Figure 18:
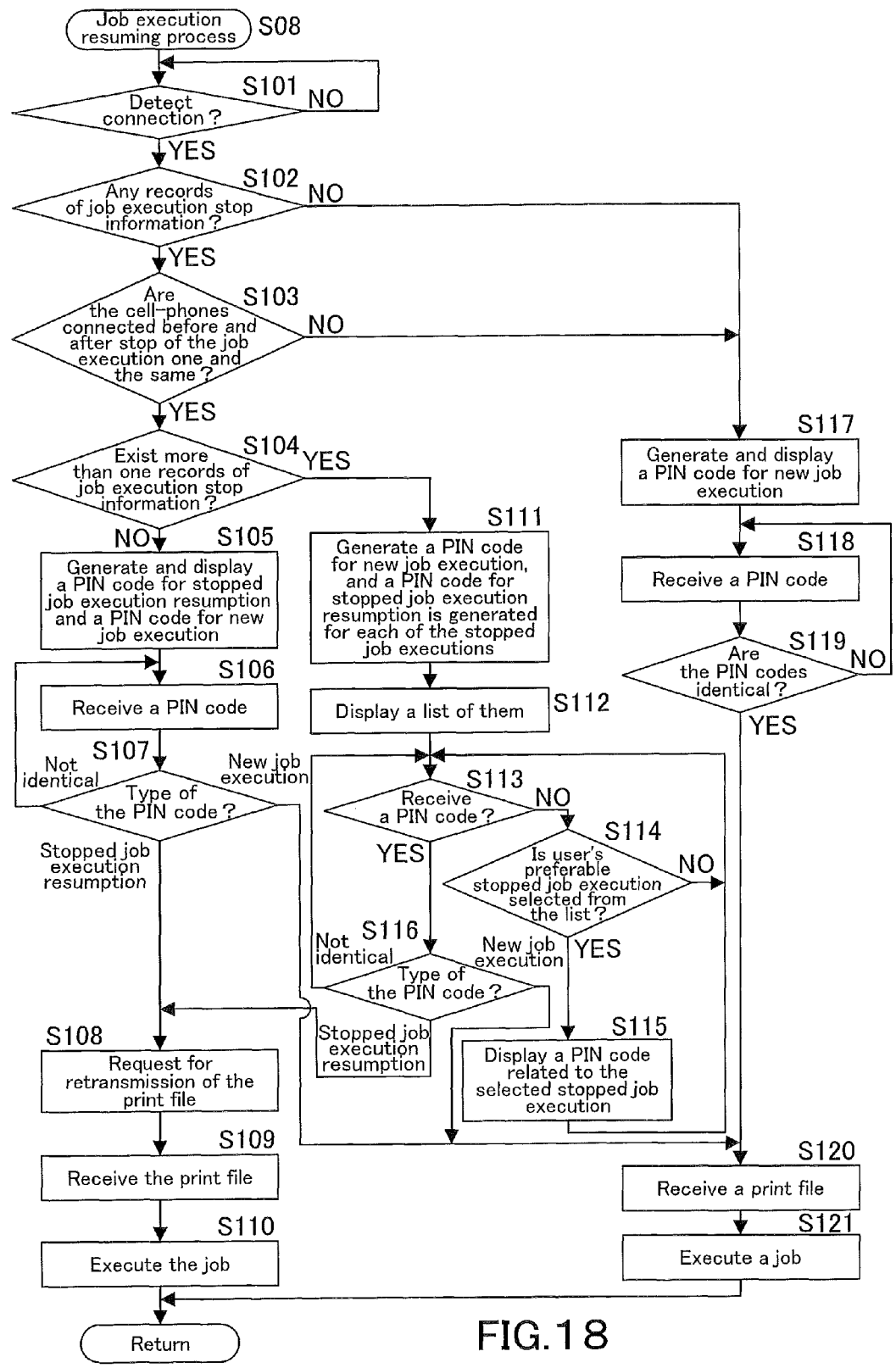
FIG. 18 is a flowchart executed in further still yet another embodiment of the present invention.

FIG. 18 shows further still yet another embodiment of the present invention, and is a flowchart representing the job execution resuming procedure of FIG. 7. In this embodiment, if there exists more than one record of job execution stop information related to the portable terminal 2, a user is allowed to select which job execution should be resumed.

As shown in FIG. 18, it is judged in Step S101, whether or not a connection with the portable terminal 2 is detected. If such a connection is not detected (NO in Step S101), the routine waits until it is detected. If such a connection is detected (YES in Step S101), then it is judged in Step S102, whether or not there stored in the memory 105 any records of job execution stop information.

If there stored any records of job execution stop information (YES in Step S102), then it is judged in Step S103, whether or not a phone number of the portable terminal 2, which is included in any of the records, in other words, a phone number of the portable terminal 2 connected before stop of the job execution, and a phone number of the currently connected portable terminal 2 are identical. If those are identical (YES in Step S103), the routine proceeds to Step S104.

In Step S104, it is judged whether or not there exists more than one record of job execution stop information related to the portable terminal 2. If there exist only one record (NO in Step S104), a PIN code for stopped job execution resumption and a PIN code for new job execution are generated in Step S105, and as shown in FIG. 8(*b*), the PIN codes are displayed on the operation panel 104, together with a message notifying of existence of a stopped print job execution and a message requesting to enter any of the PIN codes on the portable terminal 2.

And the user enters any of the displayed PIN codes on the portable terminal 2 and transmits it to the image processing apparatus 1. In Step S106, the PIN code transmitted from the portable terminal 2 is received by the image processing apparatus 1. After that, a type of the PIN code is examined in Step S107.

If the PIN code is for stopped job execution resumption ("stopped job execution resumption" in Step S107), the routine proceeds for resumption of the stopped job execution. More concretely, in Step S018, a request for retransmission of the print file is transmitted to the portable terminal 2, together with a file path indicating a storage location existing in the portable terminal 2 and storing the original print file, which is included in the job execution stop information. After that, the retransmitted print file is received in Step S109, and the job is executed in Step S110.

Meanwhile in Step S107, if the PIN code is for new job execution ("new job execution" in Step S107), the routine proceeds to Step S120, in which a new print file is received, and a job is executed in Step S121.

In Step S107, if the received PIN code is not identical with any of the PIN codes generated in Step S105 ("not identical" in Step S107), the routine goes back to Step S106 and waits until another PIN code is received.

In Step S104, if there exists more than one record of job execution stop information related to one portable terminal 2 (YES in Step S104), a PIN code for new job execution is generated, meanwhile a PIN code for stopped job execution resumption is generated for each of the stopped job executions, in Step S111. And a list of the PIN codes are displayed on the operation panel 104, in Step S112 (see FIG. 19(*a*)).

Subsequently, it is judged in Step S113, whether or not a PIN code is received from the portable terminal 2. If it is not received (NO in Step S113), then it is judged in Step S114, whether or not a preferable stopped job execution is selected from the list displayed on the operation panel 104. If it is selected (YES in Step S114), a PIN code related to the selected job execution is displayed in Step S115 (see Fig. (b) and (c)), and then the routine goes back to Step S113 and waits until it is received. Also in Step S114, if a preferable stopped job execution is not selected (NO in Step S114), the routine goes back to Step S113.

Figure 19A:
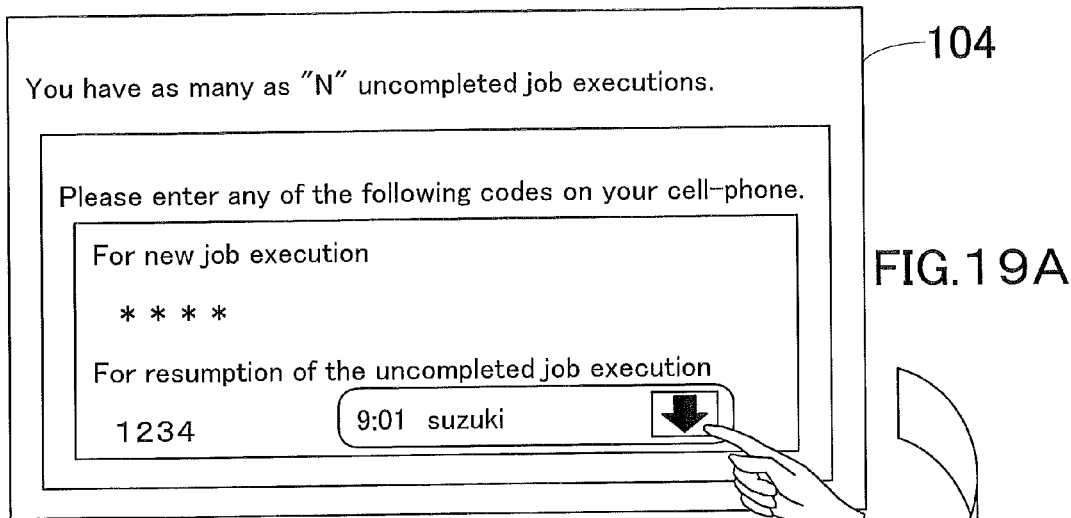
FIG. 19 is a view showing display screens that are displayed on the operation panel, if there stored more than one record of job execution stop information.
Figure 19B:
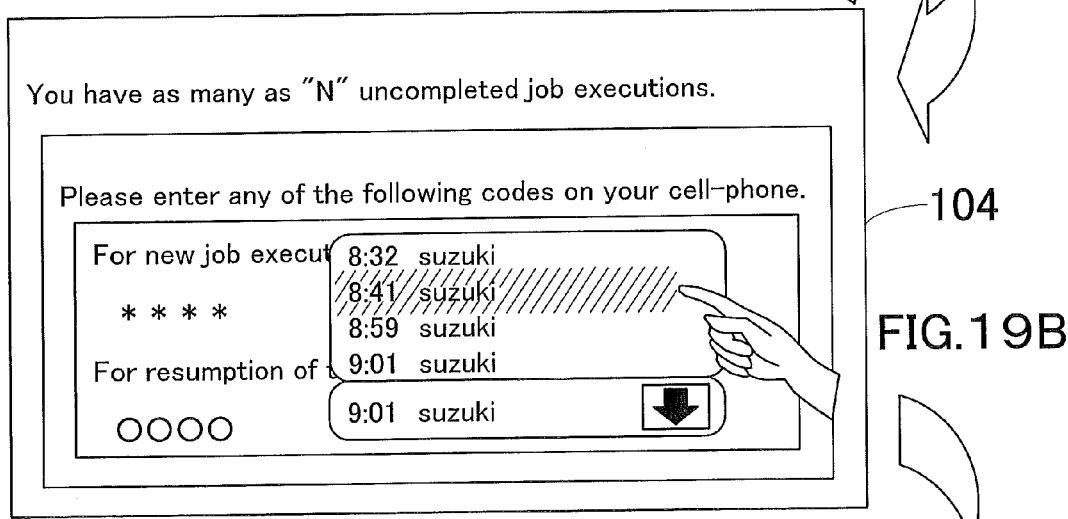
Figure 19C:
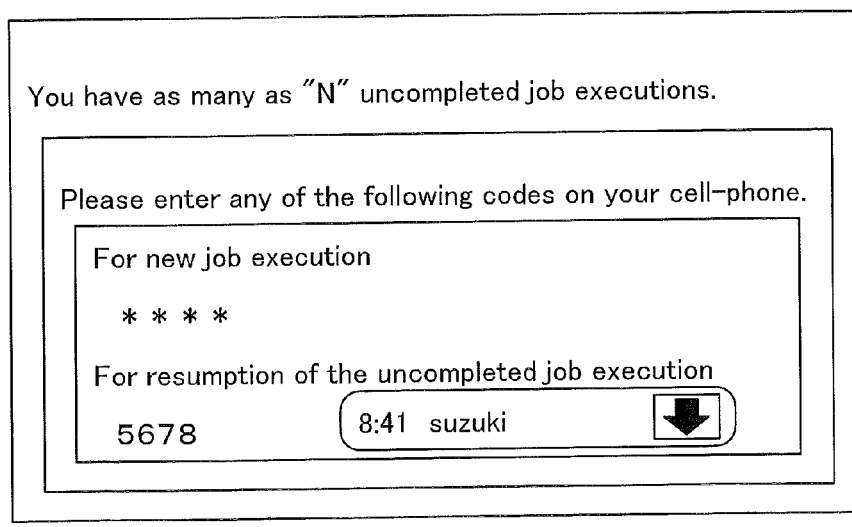

To explain FIG. 19(*a*) in particular, a PIN code for new job execution is displayed, meanwhile more than one PIN code for stopped job execution resumption is displayed in a pull-down menu. FIG. 19(*b*) shows a screen where the pull-down menu is developed, and FIG. 19(*c*) shows a screen where a preferable stopped job execution is selected from the pull-down menu. An execution time of the job execution and a name of the login user are displayed for each of the stopped job executions, so that each of them could be identified. However, other information may be displayed for each of them.

Back to Step S113 of FIG. 18, if a PIN code is received (YES in Step S113), a type of the PIN code is examined in Step S116. If the PIN code is for stopped job execution resumption ("stopped job execution resumption" in Step S116), the routine proceeds to Step S108, in which a stopped job execution that is selected by the user is resumed.

Meanwhile in Step S116, if the PIN code is for new job execution ("new job execution" in Step S116), the routine proceeds to Step S120, in which a new print job is executed.

In Step S116, if the received PIN code is not identical with any of the PIN codes generated in Step S111 ("not identical" in Step S116), the routine goes back to Step S113 and waits until another PIN code is received.

As described above, if there exists more than one stopped job execution and a user selects "stopped job execution resumption", a list of the stopped job executions is displayed on the operation panel 104. And the user selects a stopped job execution to resume, and thereby the stopped job execution is automatically resumed. This could improve usability.

In FIG. 18, if there stored no record of job execution stop information (NO in Step S102), and if the phone numbers are not identical (NO in Step S103), the routine proceeds to Step S117, in which a PIN code for new job execution is generated, and as shown in FIG. 8(*a*), it is displayed on the operation panel 104, together with a message requesting to enter the PIN code on the portable terminal 2.

And the user enters the displayed PIN code on the portable terminal 2 and transmits it to the image processing apparatus 1. In Step S118, the PIN code transmitted from the portable terminal 2 is received by the image processing apparatus 1. After that, it is judged in Step S119, whether or not the received PIN code and the PIN code generated in Step S117 are identical.

If those are not identical (NO in Step S119), the routine goes back to Step S118 and waits until another PIN code is received. If those are identical (YES in Step S119), a new job is executed in Steps S120 and S121.

In the embodiment explained with FIG. 18 and FIG. 19, there exists more than one stopped job execution related to one portable terminal 2. However, another embodiment also can be applied, wherein if there exists more than one stopped job execution related to some different portable terminals 2 and at least one of the stopped job executions relates to a reconnected portable terminal 2, a user is allowed to select a stopped job execution to resume, from a displayed list of the stopped job executions including the ones related to other users. In this case, even if a user selects a stopped job execution related to another user, the stopped job execution related to another user cannot be resumed since no print file is transmitted.

Furthermore, the number of records of job execution stop information can be fixed, in order to prevent the memory capacity of the memory 105 from being fully occupied, although it is not shown in Figures.

Figure 20:
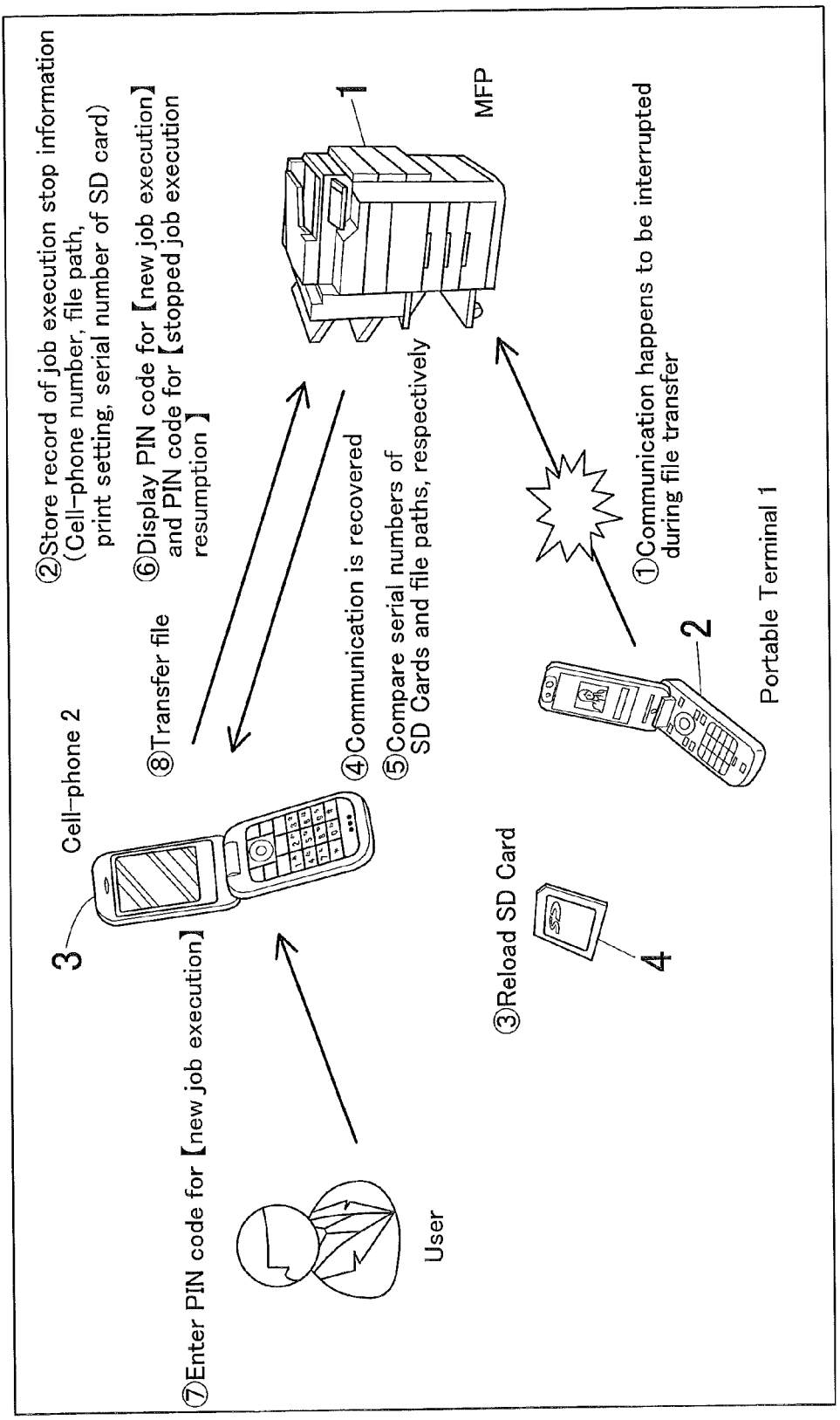
FIG. 20 is a view to explain an overview of the operations performed in this embodiment of the present invention.
Figure 21:
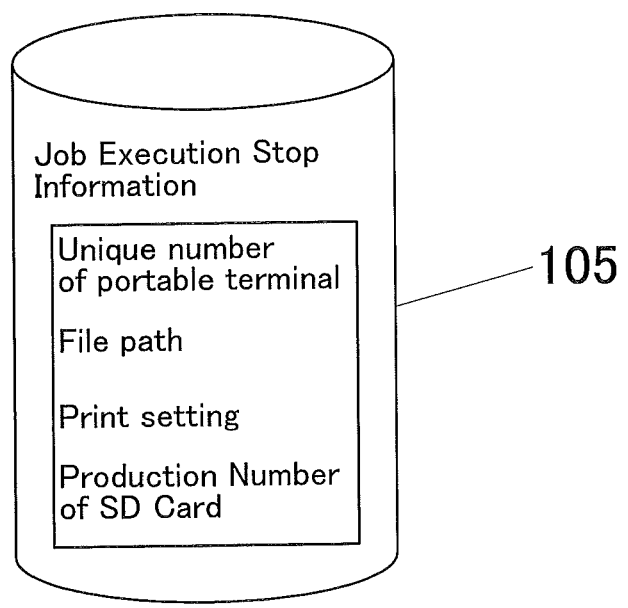
FIG. 21 is a view showing the job execution stop information used in the embodiment explained with FIG. 20.
Figure 22:
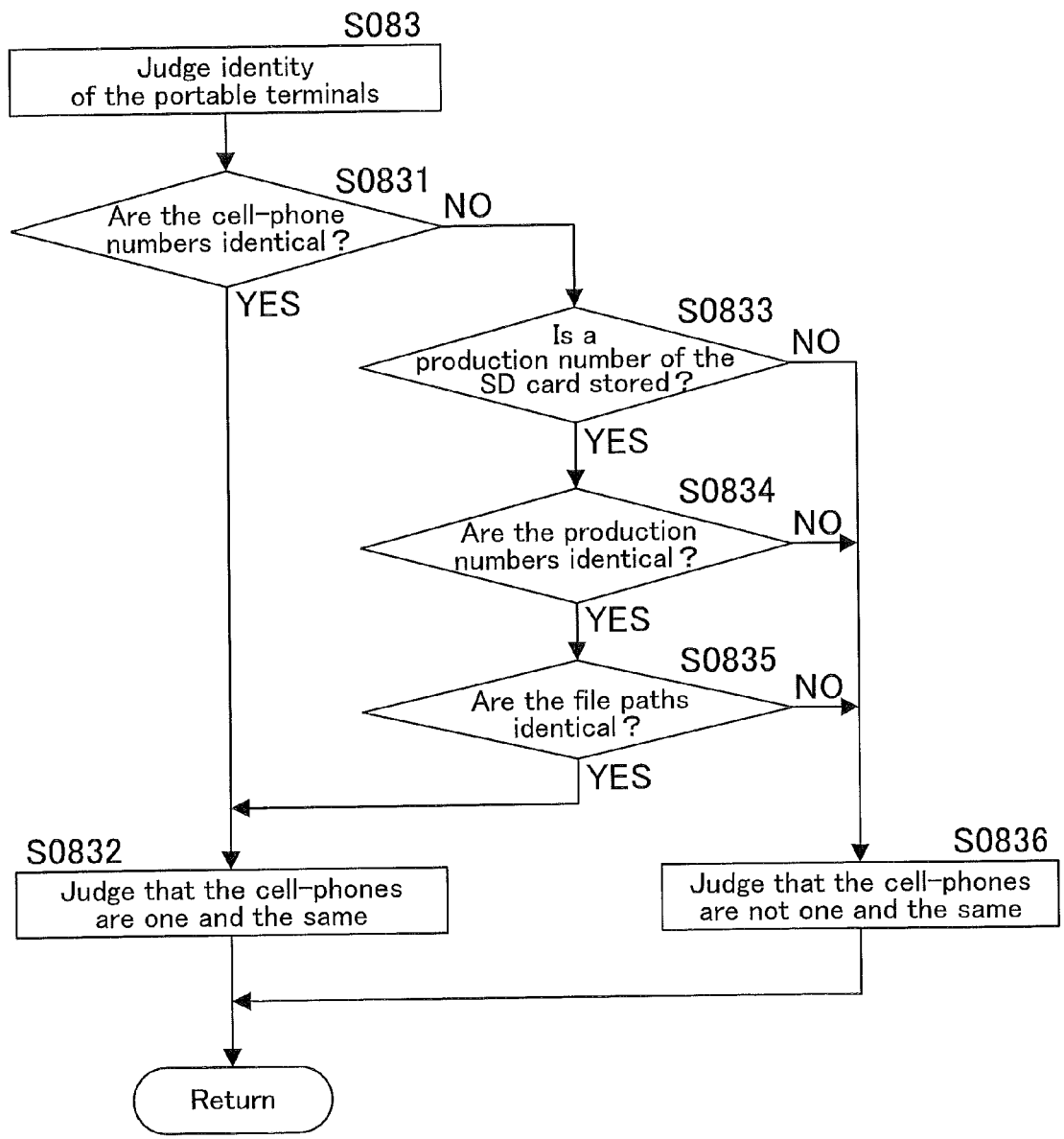
FIG. 22 is a flowchart representing a procedure to judge identity of terminal apparatuses by comparing the SD cards loaded thereon.

FIG. 20 through FIG. 22 show further still yet another embodiment of the present invention. In this embodiment, if a print file to be transmitted by the portable terminal 2 is stored in one recording medium that can be removably loaded on different portable terminals 2 and the recording medium is loaded on the different portable terminals 2 before and after stop of a job execution, respectively, it is judged that the different portable terminal 2 are one and the same, and accordingly the stopped job execution is allowed to be resumed.

In this embodiment, a SD card is used as a recording medium that can be removablly loaded on portable terminals 2, for example. The recording medium is not limited to a SD card.

FIG. 20 is a view to explain an overview of the operations performed in the above-mentioned embodiment.

If interruption of a wireless communication is detected while a print file stored in a SD card 4 loaded on the portable terminal 2 is being transferred to the image processing apparatus 1 (instruction number ① in FIG. 20), a record of job execution stop information is stored in the memory 105 of the image processing apparatus 1 (instruction number ② in FIG. 5). As shown in FIG. 21, the job execution stop information includes a phone number that is unique information of the portable terminal 2 related to the stopped job execution, a file path that indicates a storage location existing in the SD card 4 and storing the print file, a print setting, and a production number of the SD card 4.

And a user reloads the SD card 4 on a portable terminal 3 (instruction number ③) and a connection between the image processing apparatus 1 and the portable terminal 3 is established (instruction number ④). On the side of the image processing apparatus 1, the production number and the file path of the SD card 4, which are included in the job execution stop information, and a production number and a file path of the SD card 4 that is loaded on the currently connected portable terminal 3, are compared to each other (instruction number ⑤), and thereby it is judged whether or not the SD cards 4 are one and the same.

If those are one and the same, a PIN code for new job execution and a PIN code for stopped job execution resumption are generated and displayed on the operation panel 104 (instruction number ⑥).

For example, the user enters the PIN code for stopped job execution resumption on the portable terminal 3 (instruction number ⑦) and transmits the entered PIN code to the image processing apparatus 1 from the portable terminal 3. On the side of the image processing apparatus 1, the PIN code is identified. And a request for retransmission of the print file is transmitted to the portable terminal 3 from the image processing apparatus 1, together with the file path.

In response to the retransmission request, the print file read out from the SD card 4 is retransferred by the portable terminal 3 (instruction number ⑧). On the side of the image processing apparatus 1 receiving the print file, the print file is printed according to the print setting included in the job execution stop information.

FIG. 22 is a flowchart representing a procedure to judge identity of the portable terminals 2 by comparing the SD cards 4 loaded thereon, which corresponds to an identity judgment process in Step S083 of FIG. 7.

In Step S0831, it is judged whether or not the cell-phone number included in the job execution stop information and a cell-phone number of the currently connected portable terminal 2 are identical. If those are identical (YES in Step S0831), then it is judged in Step S0832, that the portable terminal 2 before stop of the job execution and the currently connected portable terminal 2 are one and the same, and thus the stopped job execution can be resumed.

If the cell-phone numbers are not identical (NO in Step S0831), then it is judged in Step S0833, whether or not a production number of the SD card 4 is included in the job execution stop information. If it is included (YES in Step S0833), then it is judged in Step S0834, whether or not the production number of the SD card 4, which is included in the job execution stop information, and a production number of the currently loaded SD card 4 are identical. If those are identical (YES in Step S0834), then it is judged in Step S0835, whether or not the print file is stored where indicated by the file path included in the job execution stop information. If it is stored (YES in Step S0835), then it is judged in Step S0832, that the portable terminal 2 connected before stop of the job execution and the currently connected portable terminal 2 are one and the same, and thus the stopped job execution can be resumed.

Meanwhile, if a production number of the SD card 4 is not included in the job execution stop information (NO in Step S0833), if a production number of the SD card 4, which is included in the job execution stop information, and a production number of the currently connected SD card 4 are not identical (NO in Step S0834), and if the print file is not stored where indicated by the file path included in the job execution stop information, the routine proceeds to Step S0836, in which it is judged that the portable terminal 2 connected before stop of the job execution and the currently connected portable terminal 2 are not one and the same. Thus, the stopped job execution cannot be resumed.

As described above, even if a recording medium such as the SD card 4 that stores a print file and is removablly loaded on the portable terminal 2 is reloaded on the portable terminal 3, a stopped job execution can be resumed. Thus, for example, even if a communication happens to be interrupted due to a breakdown or etc. of the portable terminal 2, users can continue the operation by using the portable terminal 3 having the recording medium reloaded thereon, which could improve usability.

Furthermore, identity of the SD cards 4 is judged accurately, since the judgment is made by comparing production numbers and file paths of the SD cards 4. Identity of the SD cards 4 may be judged by comparing only production numbers of the SD cards 4 or only file paths of the SD cards 4, or may be judged by comparing other information of the SD cards 4.

FIG. 23 through FIG. 27 show further yet another embodiment of the present invention. In this embodiment, the portable terminal 2 does not transfer a print file directly to the image processing apparatus 1 to make the image processing apparatus 1 execute a print job, but transfers a XHTML file including storage information to the image processing apparatus 1, to make the image processing apparatus 1 execute a print job. More concretely, storage information of the data to be processed such as an image file is included in a XHTML file, and the image processing apparatus 1 obtains the data to be processed, from a storage location included in the storage information and prints out the data to be processed, according to the layout described in the XHTML file. Printing in this way above will be referred to as "reference printing", hereinafter.

Now, an overview of the operations of reference printing will be explained with reference to FIG. 23.

Figure 23:
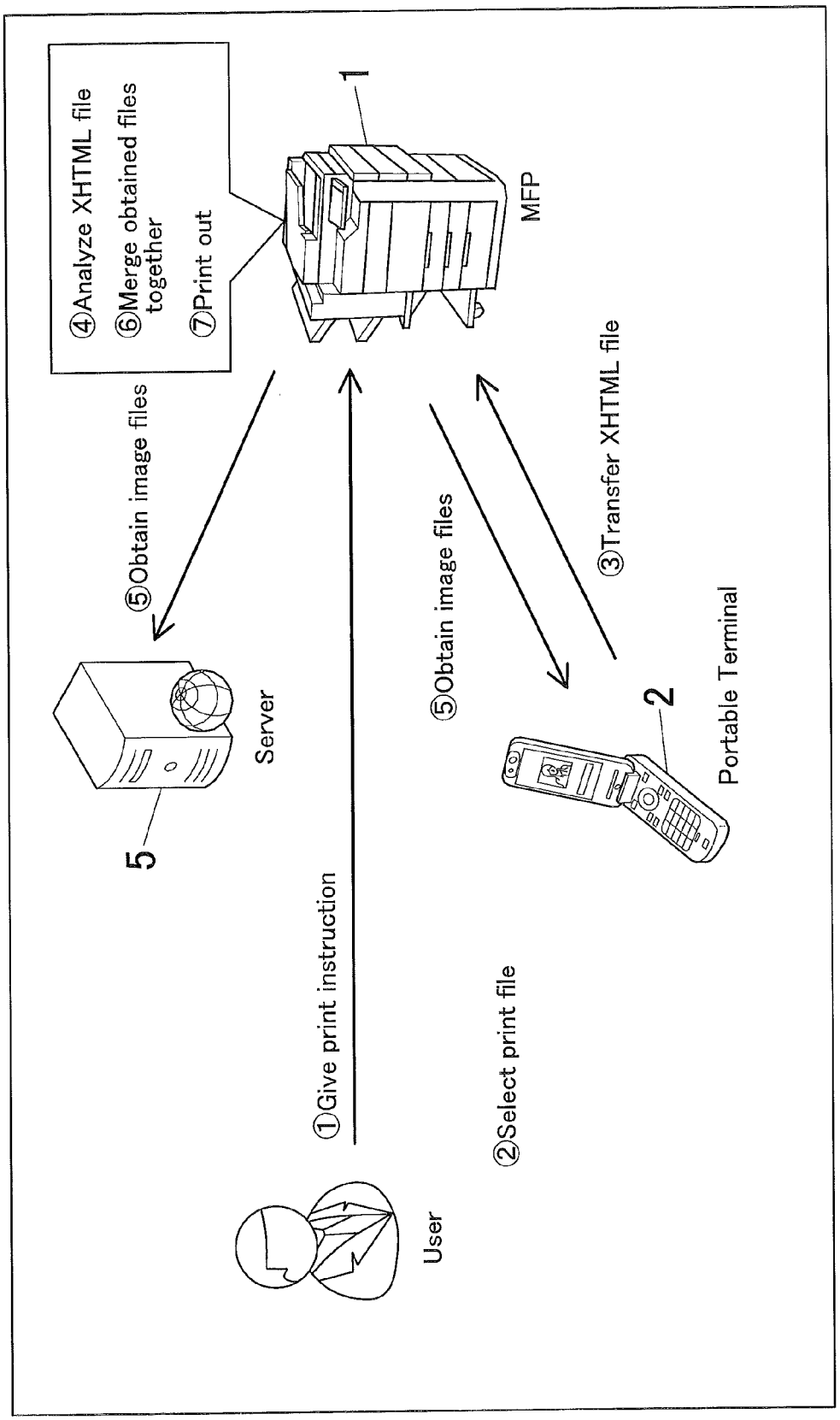
FIG. 23 is a view to explain an overview of the operations performed in this embodiment of the present invention.

As shown in FIG. 23, initially, a user selects the print-from-portable-terminal mode (instruction number ① in FIG. 1) and selects a print file (XHTML file) (instruction number ② in FIG. 1), by operating the operation panel 104 of the image processing apparatus 1.

And the user transmits the selected XHTML file to the image processing apparatus 1 from the portable terminal 2 (instruction number ③). The XTHML file includes layout information and storage information of image files. Here, for example, storage locations each storing an image file exist in the portable terminal 2 and the server 5.

On the side of the image processing apparatus 1 receiving the XHTML file, the XHTML file is analyzed (instruction number ④), and predetermined image files are obtained from the storage locations existing in the portable terminal 2 and the server 5 (instruction number ⑤). And the obtained image files are merged together according to the layout information included in the XHTML file (instruction number ⑥) then printed (instruction number ⑦).

Hereinafter, an overview of the operations performed if a job execution is stopped due to interruption of a wireless communication between the image processing apparatus 1 and the portable terminal 2, which happens to occur while the image processing apparatus 1 is receiving (the portable terminal 2 is transferring) an image file, will be explained with reference to FIG. 24.

If interruption of a wireless communication is detected while an image file stored in the portable terminal 2 is being transferred to the image processing apparatus 1 (instruction number ① in FIG. 24), the image processing apparatus 1 keeps trying to obtain an image file from the server 5 (instruction number ② in FIG. 24), meanwhile a record of job execution stop information is stored in the memory 105 of the image processing apparatus 1 (instruction number ③). As shown in FIG. 25, the job execution stop information includes a phone number that is unique information of the portable terminal 2, file paths that indicate storage locations existing in the portable terminal 2 and the server 5 and storing the print files, a print setting, and obtained information that corresponds to the obtained image file.

As soon as a wireless communication between the image processing apparatus 1 and the portable terminal 2 is recovered, the phone number included in the job execution stop information and a phone number of the currently connected portable terminal 2 are compared to each other, and thereby it is judged that the portable terminal 2 connected before stop of the job execution and the currently connected portable terminal 2 are one and the same (instruction number ④).

And then, a PIN code for new job execution and a PIN code for stopped job execution resumption are displayed on the operation panel 104 of the image processing apparatus 1 (instruction number ⑤).

For example, the user enters the PIN code for stopped job execution resumption on the portable terminal 2 (instruction number ⑥) and transmits the entered PIN code to the image processing apparatus 1 from the portable terminal 2. On the side of the image processing apparatus 1, the PIN code is identified (instruction number ⑦). And a request for retransmission of the image file is transmitted to the portable terminal 2, together with the file path (instruction number ⑧).

In response to the retransmission request, the image file is retransferred by the portable terminal 2 (instruction number ⑨). On the side of the image processing apparatus 1 receiving the image file, the received image file and the image file obtained from the server 5 are merged together according to the layout information included in the XHTML file, and print data obtained by merging the image files in this way, is printed out (instruction number ⑩).

Figure 24:
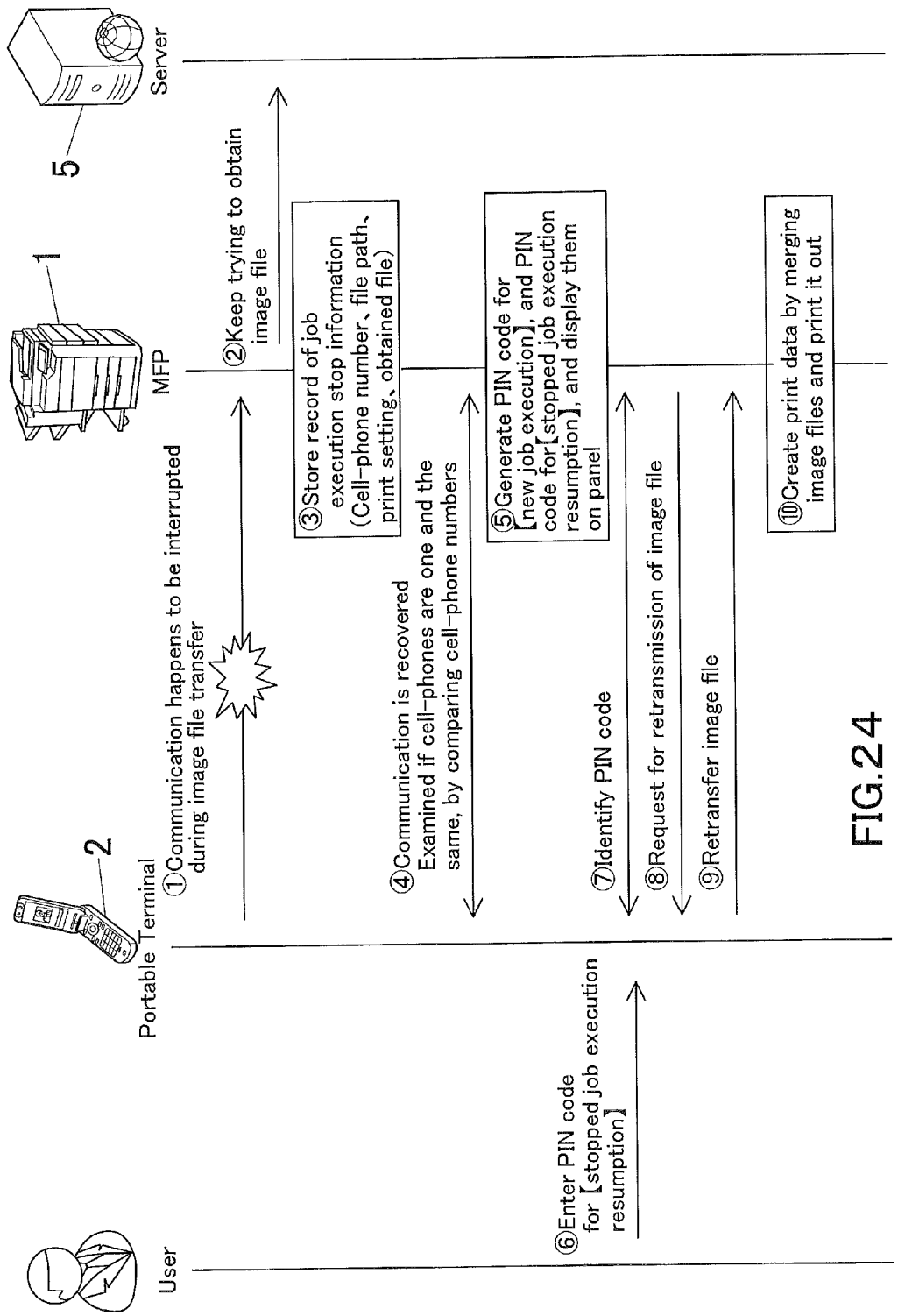
FIG. 24 is a view to explain an overview of the operations that are performed if a job execution is stopped due to interruption of a wireless communication between the image processing apparatus and the portable terminal.
Figure 25:
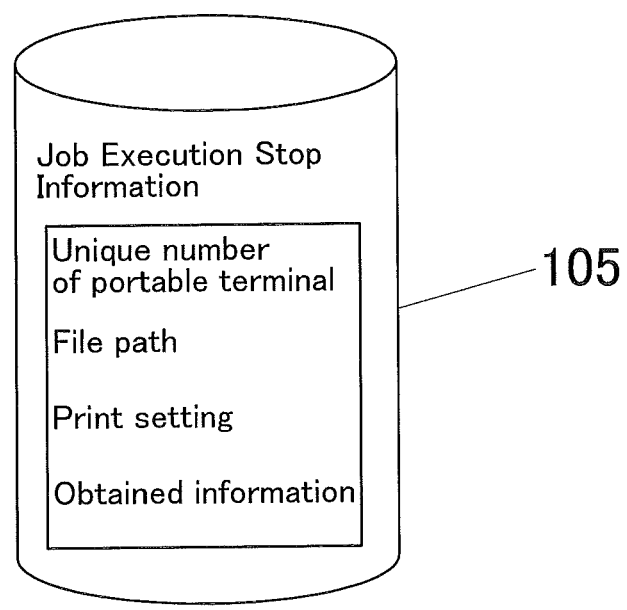
FIG. 25 is a view showing an example of the job execution stop information used in the embodiment explained with FIG. 23 and FIG. 24.
Figure 26:
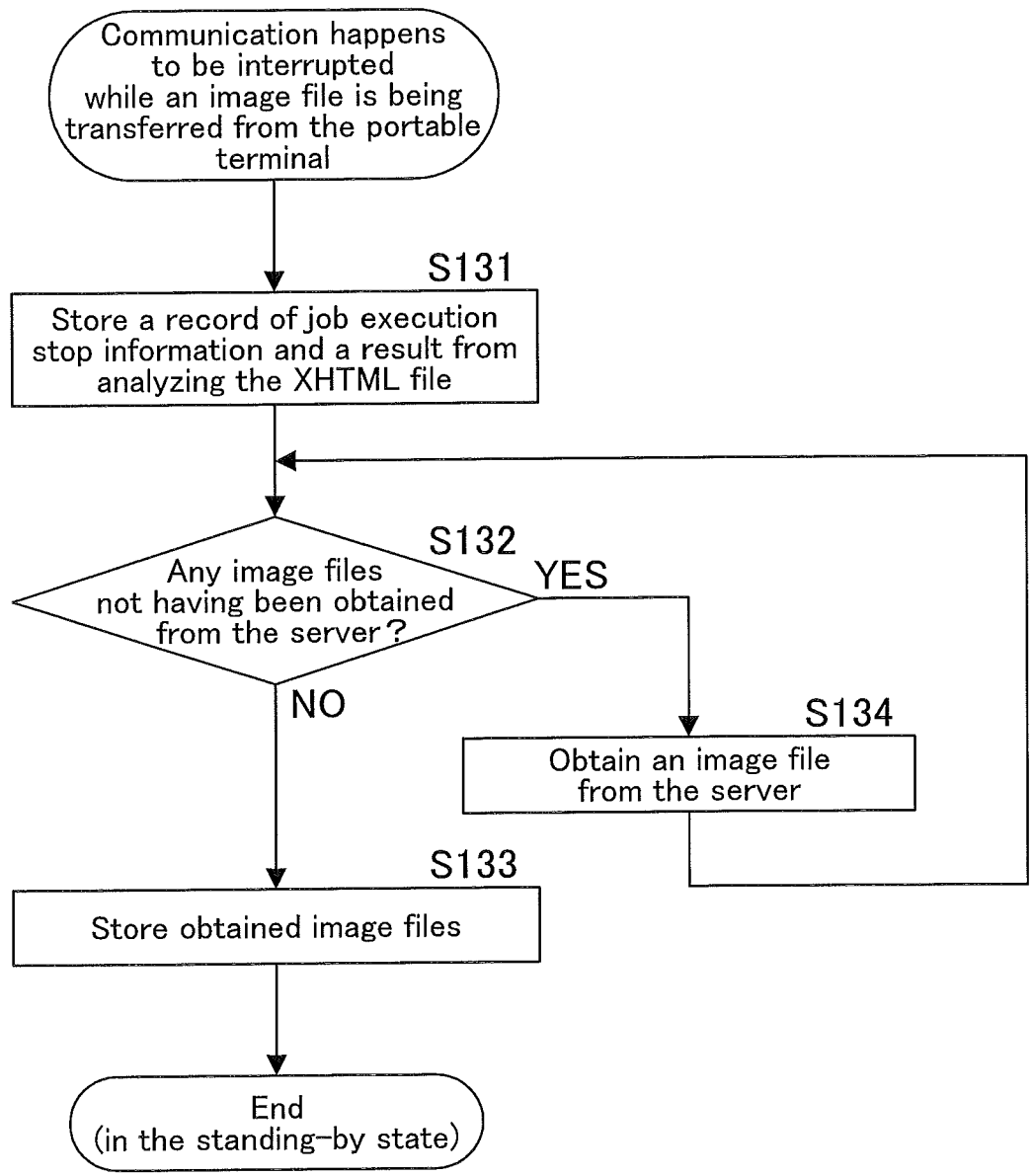
FIG. 26 is a flowchart representing a procedure executed by the CPU of the image processing apparatus, if a wireless communication happens to be interrupted while an image file is being transferred to the image processing apparatus from the portable terminal, in the embodiment explained with FIGS. 23 and 24.

FIG. 26 is a flowchart representing a procedure executed by the CPU 101a of the image processing apparatus 1, if a wireless communication happens to be interrupted while an image file is being transferred from the portable terminal 2, in the embodiment explained with FIG. 23 and FIG. 24.

In Step S131, a record of job execution stop information and a result of analyzing the XHTML file are stored in the memory 105 or etc. After that, it is judged in Step S132, whether or not there exist any image files not yet having been obtained from the server 5. If there exist such an image file (YES in Step S132), it is obtained from the server 5 in Step S134. Then the routine goes back to Step S132 and repeats the obtaining process. If all such image files having been obtained (NO in Step S132), the obtained image files are stored in the memory 105 or etc. and waits until a communication with the portable terminal 2 is recovered.

Figure 27:
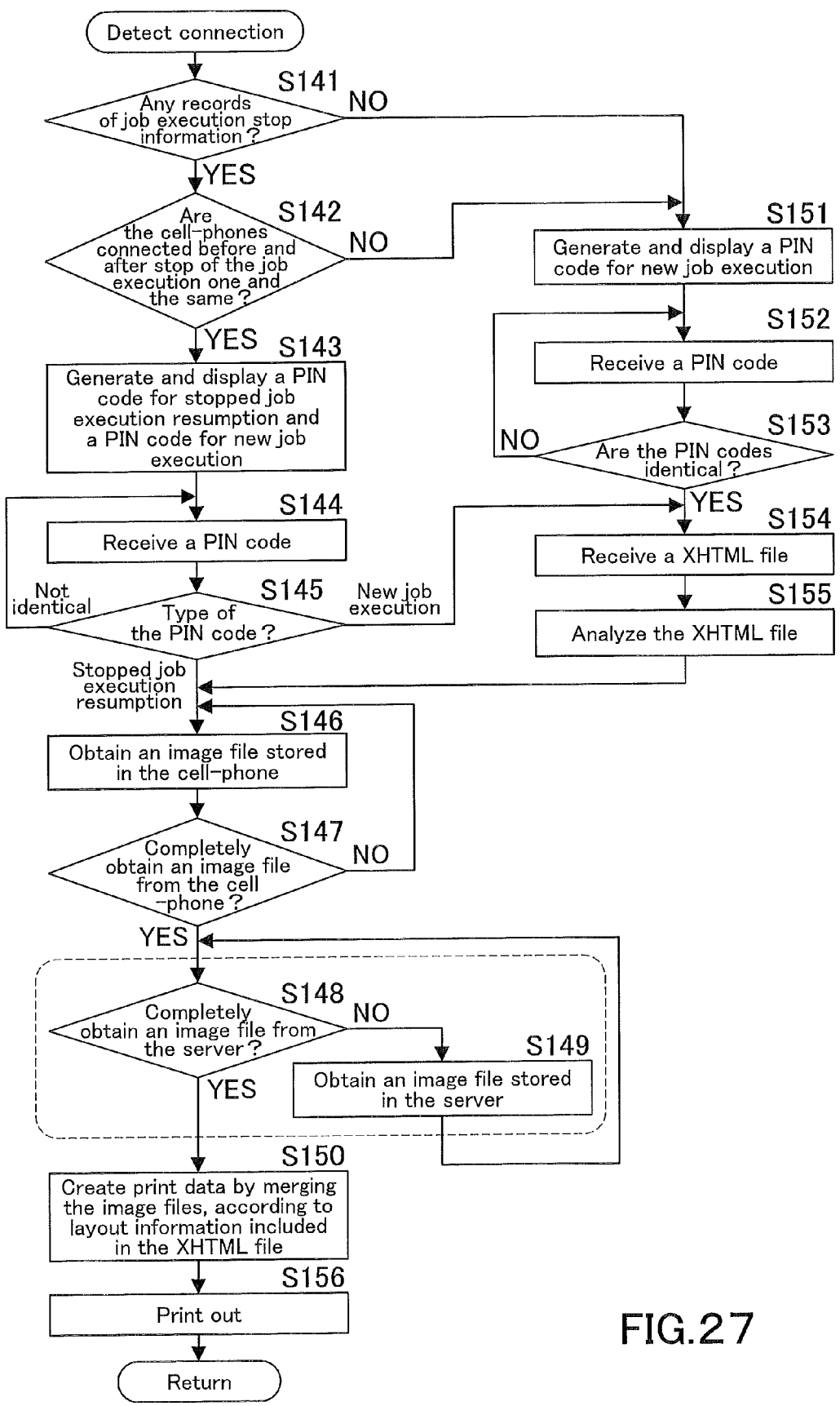
FIG. 27 is a flowchart representing a procedure executed by the CPU of the image processing apparatus, when a communication between the image processing apparatus and the portable terminal is recovered.

FIG. 27 is a flowchart representing a procedure executed by the CPU 101a of the image processing apparatus 1, when a communication with the portable terminal 2 is recovered.

In Step S141, it is judged whether or not there stored in the memory 105 a record of job execution stop information.

If there stored a record of job execution stop information (YES in Step S141), it then it is judged in Step S142, whether or not a phone number of the portable terminal 2, which is included in the job execution stop information, in other words, a phone number of the portable terminal 2 connected before stop of the job execution, and a phone number of the currently connected portable terminal 2 are identical. If those are identical (YES in Step S142), the routine proceeds to Step S143.

In Step S143, a PIN code for stopped job execution resumption and a PIN code for new job execution are generated and displayed on the operation panel 104.

And the user enters any of the displayed PIN codes on the portable terminal 2 and transmits it to the image processing apparatus 1. In Step S144, the PIN code transmitted from the portable terminal 2 is received by the image processing apparatus 1. After that, a type of the PIN code is examined in Step S145.

If the PIN code is for stopped job execution resumption ("stopped job execution resumption" in Step S145), the routine proceeds for resumption of the stopped job execution. More concretely, in Step S146, an image file stored in the portable terminal 2 is obtained by using a file path indicating a storage location existing in the portable terminal 2 and storing the image file, which is included in the job execution stop information. After that, it is judged in Step S147, the image file is completely obtained from the portable terminal 2. If it is not yet completely obtained (NO in Step S147), the routine goes back to Step S146 and repeats Steps S146 and S147 until it is completely obtained.

If it is completely obtained (YES in Step S147), then it is judged in Step S148, whether or not an image file is completely obtained from the server 5. If an image file is not yet completely obtained (NO in Step S148), it is obtained from the server 5 in Step S149, then the routine goes back to Step S148. As previously described, the process of obtaining an image file from the server 5, which corresponds to Steps S148 and S149 enclosed with a dashed line, is kept running even if a communication with the portable terminal 2 happens to be interrupted. Thus, it is advantageous that the time required for obtaining an image file from the server 5 can be shortened than in the case in which the obtaining process needs to be started all over again (a new job is executed).

If an image file is completely obtained from the server 5 (YES in Step S148), the image files are merged together according to the layout information included in the XHTML file, in Step S150. After that, print data obtained by merging the image files in this way, is printed out in Step S156.

Meanwhile in Step S145, if the PIN code is for new job execution ("new job execution" in Step S145), the routine proceeds to Step S154 for a new job execution. More concretely, an XHTML file transmitted from the portable terminal 2 is received in Step S154, and the file is analyzed in Step S155. Then the routine proceeds to Step S146, in which image files are obtained from predetermined storage locations.

In Step S145, if the received PIN code and the PIN code generated in Step S143 are not identical ("not identical" in Step S145), the routine goes back to Step S144 and waits until another PIN code is received.

Meanwhile, if there stored no record of job execution stop information in Step S141 (NO in Step S141), and if the phone numbers are not identical in Step S142 (NO in Step S142), the routine proceeds to Step S151, in which a PIN code for new job execution is generated and displayed on the operation panel 104.

And the user enters the displayed PIN code on the portable terminal 2 and transmits it to the image processing apparatus 1. In Step S152, the PIN code transmitted from the portable terminal 2 is received by the image processing apparatus 1. After that, it is judged in Step S153, whether or not the received PIN code and the PIN code generated in Step S151 are identical.

If those are not identical (NO in Step S153), the routine goes back to Step S152 and waits until another PIN code is received. If those are identical (YES in Step S153), a XHTML file is received in Step S154, and the XHTML file is analyzed in Step S155. Then the routine proceeds to Step S146, in which image files are obtained from predetermined storage locations.

As described above in this embodiment, if a wireless communication between the image processing apparatus 1 and the portable terminal 2 happens to be interrupted before the image processing apparatus 1 completely obtains an image file stored in the portable terminal 2 meanwhile storage information included in an XHTML file indicates that storage locations each storing an image file exist in the portable terminal 2 and the server 5, a user does not have to start all over again the operation of transmitting storage information of the data to be processed, to the image processing apparatus 1 from the portable terminal 2, which could improve usability.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
a receiver that receives data to be processed, which data is transmitted by a portable terminal, wirelessly;
a job executor that executes a job on the data to be processed, which is received by the receiver;
a detector that detects that a job executed on the data to be processed is stopped due to interruption of the wireless communication with the portable terminal, which happens to occur while the receiver is receiving the data to be processed;
a judger that judges whether or not portable terminals connected before and after the detector detects stop of the job execution are one and the same;
a requestor that requests the reconnected portable terminal to retransmit the data to be processed, if the judger judges that the portable terminals are one and the same; and
a job execution resuming portion that makes the job executor resume executing the job on the data to be processed, which is retransmitted in response to the requestor's request, wherein
the judger judges that the portable terminals connected before and after stop of the job execution should be treated as they are one and the same if the data to be processed is stored in one recording medium that can be removably loaded on the portable terminals, and if the one recording medium connected before the stop of job execution is determined to be the same one recording medium connected after the stop of job execution, the portable terminals transmitting the data to be processed by using the one recording medium.

2. The image processing apparatus recited in claim 1, further comprising:
a storage that stores in itself information about the stopped job execution, and wherein:
the requestor identifies the data to be processed, which is not successfully received, based on the information about the stopped job execution, which is stored in the storage, and then requests to retransmit the identified data.

3. The image processing apparatus recited in claim 2, wherein: the information about the stopped job execution indicates a storage location existing in the portable terminal and storing the data to be processed, and the requestor requests to retransmit the data to be processed based on the information indicating a storage location storing the data to be processed.

4. The image processing apparatus recited in claim 2, further comprising:
a generator that generates a first identification information for resumption of the stopped job execution and a second identification information for new job execution, before retransmission of the data to be processed is requested; and
a notifier that gives to a user, the generated first and second identification information, and wherein:
the requestor requests the portable terminal, to retransmit the data to be processed, if the receiver receives the first identification information that the user is notified of by the notifier and transmitted by the portable terminal.

5. The image processing apparatus recited in claim 4, wherein:
the generator generates the first identification information, if the information about the stopped job execution is stored in the storage.

6. The image processing apparatus recited in claim 4, further comprising:
a deleter that deletes the information about the stopped job execution, which is stored in the storage, if the receiver receives the second identification information.

7. The image processing apparatus recited in claim 4, wherein:
a list of more than one stopped job execution is displayed on a display in order to allow a user to select which is preferred to be resumed, if the receiver receives the first identification information when there exist the more than one stopped job execution because a new job executed on the data to be processed is stopped due to interruption of the wireless communication with the portable terminal, which happens to occur again while the receiver is receiving the data to be processed for new job execution after the second identification information.

8. The image processing apparatus recited in claim 2, further comprising:
a generator that generates a third identification information for deletion of the information about the stopped job execution, which is stored in the storage, before retransmission of the data to be processed is requested;
a notifier that gives to a user, the generated third identification information;
a deleter that deletes the information about the stopped job execution, which is stored in the storage, if the receiver receives the third identification information that the user is notified of by the notifier and transmitted by the portable terminal.

9. The image processing apparatus recited in claim 2, further comprising:
a deleter that deletes the information about the stopped job execution, which is stored in the storage, if a predetermined period of time has elapsed since the job execution is stopped.

10. The image processing apparatus recited in claim 2, further comprising:
a deleter deletes the information about the stopped job execution, which is stored in the storage, if the job execution is stopped while a user allowed to use the image processing apparatus by user authentication is in login status and then the user logs out before retransmission of the data to be processed is requested.

11. The image processing apparatus recited in claim 2, wherein: the information about the stopped job execution includes a job execution condition, and the stopped job execution resuming portion makes the job executor resume executing the job on the data to be processed, which is retransmitted therefrom after stop of the job execution, under the job execution condition stored in the storage.

12. The image processing apparatus recited in claim 1, further comprising:
a transmission log obtainer that obtains transmission log information from the reconnected portable terminal, and wherein:
the requestor requests the portable terminal, to retransmit the data to be processed, which is not successfully received, based on the transmission log information obtained by the transmission log obtainer.

13. The image processing apparatus recited in claim 12, wherein:
the requestor requests the portable terminal, to delete the data to be processed, after the receiver receives the data to be processed.

14. The image processing apparatus recited in claim 1, wherein:
the requestor requests to retransmit the data to be processed, if the job execution is stopped while a user allowed to use the image processing apparatus by user authentication is in login status and then the user is authenticated again and logs in the image processing apparatus before the requestor requests to retransmit the data to be processed.

15. The image processing apparatus recited in claim 1, further comprising:
a notifier that gives to a user, a message including instructions suggested due to interruption of the wireless communication with the portable terminal, which happens to occur again while the receiver is receiving the data to be processed, if the job executed on the data to be processed, which is retransmitted by the portable terminal in response to the requestor's request, is stopped due to the interruption.

16. The image processing apparatus recited in claim 1, further comprising:
a storage that stores in itself information about the recording medium and information indicating a storage location existing in the recording medium and storing the data to be processed, and wherein:
the judger judges that different portable terminals connected before and after stop of the job execution are one and the same, if the information stored in the storage existing in the recording medium loaded on the portable terminals are exactly the same.

17. The image processing apparatus recited in claim 1, wherein the judger judges whether or not a serial number of the one recording medium loaded on the portable terminal before stop of the job execution is identical to a serial number of the one recording medium loaded on the reconnected portable terminal after stop of the job execution.

18. An image processing apparatus comprising:
   a receiver that receives data that is transmitted by a portable terminal, wirelessly;
   a data obtainer that obtains the data to be processed, from a storage location storing the data to be processed, based on the data including layout information and storage information of the data to be processed, which is received by the receiver;
   a detector that detects that a job executed on the data to be processed is stopped due to interruption of the wireless communication with the portable terminal;
   a judger that judges whether or not portable terminals connected before and after the detector detects stop of the job execution are one and the same;
   a controller that makes the data obtainer continue obtaining the data to be processed, which is stored in a storage location existing outside of the portable terminal, if the data obtainer has not yet completely obtained it by the time the detector detects stop of the job execution, or alternatively, makes the data obtainer continue obtaining the data to be processed, which is stored in a storage location existing inside of the portable terminal, if the data obtainer has not yet completely obtained it by the time the judger judges that portable terminals connected before and after stop of the job execution are one and the same;
   a layout portion that layouts all the received data to be processed, according to the layout information; and
   a job executor that executes a job on the layouted data to be processed, wherein
   the judger judges that different portable terminals connected before and after stop of the job execution should be treated as they are one and the same if the storage location existing inside of the portable terminal is in one recording medium that can be removably loaded on the portable terminals, and if the one recording medium connected before the stop of job execution is determined to be the same one recording medium connected after the stop of job execution, the portable terminals transmitting the data to be processed by using the one recording medium.

19. The image processing apparatus recited in claim 18, wherein the judger judges whether or not a serial number of the one recording medium loaded on the portable terminal before stop of the job execution is identical to a serial number of the one recording medium loaded on the portable terminal connected after stop of the job execution.

20. A job execution method of an image processing apparatus, comprising:
   receiving data to be processed, which data is transmitted by a portable terminal, wirelessly;
   executing a job on the received data to be processed;
   detecting that the job executed on the data to be processed is stopped due to interruption of the wireless communication with the portable terminal, which happens to occur while the data to be processed is being received;
   judging whether or not portable terminals connected before and after stop of the job execution is detected, are one and the same;
   requesting the reconnected portable terminal to retransmit the data to be processed, if it is judged that the portable terminals are one and the same;
   resuming executing the job on the data to be processed, which is retransmitted in response to the request, and judging that different portable terminals connected before and after stop of the job execution should be treated as they are one and the same if the data to be processed is stored in one recording medium that can be removably loaded on the portable terminals, and if the one recording medium connected before the stop of job execution is determined to be the same one recording medium connected after the stop of job execution, the portable terminals transmitting the data to be processed by using the one recording medium.

21. The job execution method recited in claim 20, further comprising judging whether or not a serial number of the one recording medium loaded on the portable terminal before stop of the job execution is identical to a serial number of the one recording medium loaded on the reconnected portable terminal after stop of the job execution.

22. A job execution method of an image processing apparatus, comprising:
   receiving data that is transmitted by a portable terminal, wirelessly;
   obtaining the data to be processed, from a storage location storing the data to be processed, based on the received data including layout information and storage information of the data to be processed;
   detecting that a job executed on the data to be processed is stopped due to interruption of the wireless communication with the portable terminal;
   judging whether or not portable terminals connected before and after stop of the job execution is detected, are one and the same;
   continuing obtaining the data to be processed, which is stored in a storage location existing outside of the portable terminal, if the data to be processed has not yet completely been obtained by the time stop of the job execution is detected, or alternatively, continuing obtaining the data to be processed, which is stored in a storage location existing inside of the portable terminal, if the data to be processed has not yet completely been obtained by the time it is judged that portable terminals connected before and after stop of the job execution are one and the same;
   layouting all the obtained data to be processed, according to the layout information;
   executing a job on the layouted data to be processed, and judging that different portable terminals connected before and after stop of the job execution should be treated as they are one and the same if the storage location existing inside of the portable terminal is in one recording medium that can be removably loaded on the portable terminals, and if the one recording medium connected before the stop of job execution is determined to be the same one recording medium connected after the stop of job execution, the portable terminals transmitting the data to be processed by using the one recording medium.

23. The job execution method recited in claim 22, further comprising judging whether or not a serial number of the one recording medium loaded on the portable terminal before stop of the job execution is identical to a serial number of the one recording medium loaded on the portable terminal connected after stop of the job execution.

24. A non-transitory computer readable recording medium having a job execution program recorded therein to make a computer of an image processing apparatus execute:
   receiving data to be processed, which data is transmitted by a portable terminal, wirelessly;
   executing a job on the received data to be processed;

detecting that the job executed on the data to be processed is stopped due to interruption of the wireless communication with the portable terminal, which happens to occur while the data to be processed is being received;

judging whether or not portable terminals connected before and after stop of the job execution is detected, are one and the same;

requesting the reconnected portable terminal to retransmit the data to be processed, if it is judged that the portable terminals are one and the same;

resuming executing the job on the data to be processed, which is retransmitted in response to the request, and judging that different portable terminals connected before and after stop of the job execution should be treated as they are one and the same if the data to be processed is stored in one recording medium that can be removably loaded on the portable terminals, and if the one recording medium connected before the stop of job execution is determined to be the same one recording medium connected after the stop of job execution, the portable terminals transmitting the data to be processed by using the one recording medium.

25. The non-transitory computer readable recording medium recited in claim 24, wherein the job execution program makes the image processing apparatus judge whether or not a serial number of the one recording medium loaded on the portable terminal before stop of the job execution is identical to a serial number of the one recording medium loaded on the reconnected portable terminal after stop of the job execution.

26. A non-transitory computer readable recording medium having a job execution program recorded therein to make a computer of an image processing apparatus execute:

receiving data that is transmitted by a portable terminal, wirelessly;

obtaining the data to be processed, from a storage location storing the data to be processed, based on the received data including layout information and storage information of the data to be processed;

detecting that a job executed on the data to be processed is stopped due to interruption of the wireless communication with the portable terminal;

judging whether or not portable terminals connected before and after stop of the job execution is detected, are one and the same;

continuing obtaining the data to be processed, which is stored in a storage location existing outside of the portable terminal, if the data to be processed has not yet completely been obtained by the time stop of the job execution is detected, or alternatively, continuing obtaining the data to be processed, which is stored in a storage location existing inside of the portable terminal, if the data to be processed has not yet completely been obtained by the time it is judged that portable terminals connected before and after stop of the job execution are one and the same;

layouting all the obtained data to be processed, according to the layout information;

executing a job on the layouted data to be processed, and judging that different portable terminals connected before and after stop of the job execution should be treated as they are one and the same, if the storage location existing inside of the portable terminal is in one recording medium that can be removably loaded on the portable terminals, and if the one recording medium connected before the stop of job execution is determined to be the same one recording medium connected after the stop of job execution, the portable terminals transmitting the data to be processed, by using the one recording medium.

27. The non-transitory computer readable recording medium recited in claim 26, wherein the job execution program makes the image processing apparatus judge whether or not a serial number of the one recording medium loaded on the portable terminal before stop of the job execution is identical to a serial number of the one recording medium loaded on the portable terminal connected after stop of the job execution.

* * * * *